(12) United States Patent
Iwayama et al.

(10) Patent No.: US 7,559,458 B2
(45) Date of Patent: Jul. 14, 2009

(54) VALIDITY ASSURANCE SYSTEM, VALIDITY ASSURANCE METHOD, AND RECORDING MEDIUM STORING A PROGRAM

(75) Inventors: Yutaka Iwayama, Kawasaki (JP); Tatsuro Matsumoto, Kawasaki (JP); Kazuo Sasaki, Kawasaki (JP); Masayuki Fukui, Kawasaki (JP); Ai Yano, Kawasaki (JP); Eiichi Takahashi, Kawasaki (JP); Masahiro Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 11/857,723

(22) Filed: Sep. 19, 2007

(65) Prior Publication Data

US 2008/0067229 A1 Mar. 20, 2008

(30) Foreign Application Priority Data

Sep. 20, 2006 (JP) ............................. 2006-254617

(51) Int. Cl.
*G06K 5/00* (2006.01)
(52) U.S. Cl. ............................ 235/375; 705/30; 705/40; 705/400
(58) Field of Classification Search ................. 235/375; 705/30, 40, 400
See application file for complete search history.

(56) References Cited

U.S. PATENT DOCUMENTS

| 2004/0049459 | A1* | 3/2004 | Philliou et al. ................. 705/40 |
| 2006/0059088 | A1* | 3/2006 | Krikorian et al. ............. 705/40 |
| 2006/0089907 | A1* | 4/2006 | Kohlmaier et al. ............ 705/40 |

FOREIGN PATENT DOCUMENTS

| JP | 62286165 A | 12/1987 |
| JP | 1063690 A | 3/1998 |
| JP | 2004240675 A | 8/2004 |

* cited by examiner

*Primary Examiner*—Allyson N Trail
(74) *Attorney, Agent, or Firm*—Westerman, Hattori, Daniels & Adrian, LLP.

(57) ABSTRACT

A validity assurance system of the present invention includes a terminal apparatus that generates a slip based on slip item data representing a slip item and slip content data representing a slip content corresponding to the slip item, a slip management apparatus including a slip management database that stores the slip content data representing the slip content of the slip generated by the terminal apparatus, and an invoice issuing apparatus that generates an invoice based on the slip content data stored in the slip management database, wherein in a case where a slip identification code generated by a slip identification code generating part of the terminal apparatus is matched with an invoice identification code generated by an invoice identification code generating part of the invoice issuing apparatus, validity of the voucher is assured.

9 Claims, 25 Drawing Sheets

| Slip item ID | Slip item | Slip content |
|---|---|---|
| 001 | Customer's name | Taro Yamada |
| 002 | Operator's name | Taro Fujitsu |
| 003 | Operation time and date | 2006. 8. 3 |
| 004 | Operation hours | 3 hours |
| 005 | Operation content Phenomenon | A power is turned off several minutes after the boot-up of a computer |
| 006 | Operation content Cause | Increase in temperature of a CPU caused by the break-down of a CPU fan |
| 007 | Operation content Procedure | Exchange of a CPU fan |
| 008 | Exchange component | CPU fan, fixing hardware |
| 009 | Estimate amount | ¥25,000 |
| 010 | Signature | Taro Yamada |

| Connection order |
|---|
| 001-005-006-007-009 |

| Character string data |
|---|
| Customer's name; Taro Yamada; Operation content phenomenon; A power is turned off several minutes after the boot-up of a computer; Operation content cause; Increase in temperature of a CPU caused by the break-down of a CPU fan; Operation content procedure; Exchange of a CPU fan; Estimate amount; ¥25,000 |

| Slip identification code |
|---|
| 25a368k5ch |

Repair slip — 2a

Slip identification code: 25a368k5ch

Mr. Taro Yamada

Operator's name: Taro Fujitsu
Operation date and time: 2006. 8. 3
Operation hours: 3 hours Operation content

- Phenomenon: A power is turned off several minutes after the boot-up of a computer
- Cause: Increase in temperature of a CPU caused by the break-down of a CPU fan
- Procedure: Exchange of a CPU fan
- Exchange components: CPU fan, fixing hardware
- Estimate amount: ¥25,000

Signature: Taro Yamada

Invoice

|   |   |
|---|---|
|   | Invoice identification code |
| Mr. Taro Yamada | 25a368k5ch |

| | |
|---|---|
| Operation date and time | 2006. 8. 3 |
| Operation hours | 3 hours |
| Operation content | Exchange of a CPU fan |
| Exchange components | CPU fan, fixing hardware |
| Charge amount | ¥26,000 |
| Transfer bank | O×Bank△□Branch |
| Account number | 12345678 |

FIG. 22 http://hogehoe.fujitsu.com/index.html 001-005-006-007-009

- Operator's name: Taro Fujitsu
- Operation date and time: 2006. 8. 3
- Operation hours: 3 hours
- Operation content
  - Phenomenon: A power is turned off several minutes after the boot-up of a computer
  - Cause: Increase in temperature of a CPU caused by the break-down of a CPU fan
  - Procedure: Exchange of a CPU fan

VALIDITY ASSURANCE SYSTEM, VALIDITY ASSURANCE METHOD, AND RECORDING MEDIUM STORING A PROGRAM

BACKGROUND OF THE INVENTION

1. Field of the Invention

The present invention relates to a validity assurance system, a validity assurance method, and a recording medium storing a program. More specifically, the present invention relates to a validity assurance system including a terminal apparatus that generates a slip, a slip management apparatus including a slip management database that stores slip content data representing the contents of a slip generated by the terminal apparatus, and a voucher issuing apparatus that generates a voucher based on slip content data stored in the slip management database, a validity assurance method, and a recording medium storing a program.

2. Description of Related Art

Conventionally, when various electronic appliances such as a refrigerator, a washing machine, a microwave oven, a television, a printer, a personal computer, a facsimile, and a crime-preventing device, and various facilities such as a plant system are broken down, a customer generally inquires of a shop, a manufacturer, or the like about the breakdown, and requests the repair of the broken-down electronic appliance. Furthermore, in the case where an inspector of a shop or a manufacturer in various kinds of appliances and facilities visits periodically to check the presence/absence of abnormality irrespective of whether or not various kinds of appliances and facilities are broken down, and finds abnormality, the inspector or a repairperson arranged separately also generally conducts a repair.

The shop or manufacturer that has received a repair request dispatches a repairperson such as an engineer to the customer. The repairperson that has been dispatched to the customer repairs the broken-down electronic appliance. When the repair of the electronic appliance is completed, the repairperson generates a repair slip, using a terminal apparatus such as a personal digital assistant (PDA), for example. Herein, the repair slip is provided with slip items such as an operator's name, an operation date and time, operation hours, operation contents, an exchange component, and an estimate amount. More specifically, the repairperson inputs slip contents corresponding to the slip items through a touch panel provided on a display screen of the terminal apparatus, for example.

The customer checks the slip contents of the repair slip input by the repairperson on the display screen, and if there is no mistake in the slip contents, writes a signature through the touch panel provided on the display screen of the terminal apparatus, for example. The customer writes a signature by tracing the display screen of the terminal apparatus, for example, with a touch pen. After the customer writes a signature, the repairperson prints the repair slip with the customer's signature written thereon, using a printing function provided in the terminal apparatus. The printed repair slip is given to the customer.

After giving the repair slip to the customer, the repairperson sends the repair slip to the slip management apparatus as repair slip data by operating the terminal apparatus. When acquiring the repair slip data sent from the terminal apparatus, the slip management apparatus stores the repair slip data in the repair management database provided in the repair management apparatus. In the slip management database of the slip management apparatus, a plurality of repair slip data acquired from the plurality of terminal apparatuses are stored (e.g., see JP 2004-240675 A).

After that, in an invoice issuing department of the shop, manufacturer, or the like that has conducted the repair, an invoice (voucher) for making a charge of a repair fee is issued. More specifically, a person in charge of issuing an invoice in the invoice issuing department downloads the repair slip data, based on which an invoice is issued, from the plurality of repair slip data stored in the slip management database to an invoice issuing apparatus. The person in charge of issuing an invoice refers to slip contents described in the repair slip represented by the downloaded repair slip data, and calculates a charge amount. The person in charge of issuing an invoice issues an invoice describing charge contents such as a charge amount, a transfer account number, an operation date and time, operation hours, operation contents, and an exchange component, using the invoice issuing apparatus. The issued invoice is sent to the customer from the person in charge of issuing an invoice by mail (e.g., see JP 10(1998)-63690 A).

The customer pays the charge amount (repair fee) to the shop, manufacturer, or the like that has conducted the repair, based on the invoice sent from the invoice issuing department.

Even during maintenance, at a time of an inspection operation, inspected items and the results thereof are checked, and the matter that needs repairing and the countermeasure against it are checked. At a later date, the achievement of the inspection operation is checked. Alternatively, in the case where the repair is on a chargeable basis, an invoice is issued in the same way as in the above.

However, there may be a case where the customer has doubts about the charge contents in the invoice before paying the charge amount (e.g., a case where the charge amount described in an invoice is different from the estimate amount described in the repair slip). In such a case, the customer needs to check whether or not the charge contents in the invoice are matched with the slip contents of the repair slip.

Specifically, it is necessary for the customer to check whether or not the charge contents such as a charge amount, an operation date and time, operation hours, and operation contents described in the invoice are matched with the slip contents such as an estimate amount, an operation date and time, operation hours, and operation contents described in the repair slip for each item. Therefore, there arises a problem that a lot of time and labor are incurred in the customer.

SUMMARY OF THE INVENTION

The present invention has been achieved in view of the above problems, and its object is to provide a validity assurance system, a validity assurance method, and a recording medium storing a program, capable of easily checking the validity of a voucher without incurring time and labor on a customer side.

In order to achieve the above-mentioned object, a validity assurance system according to the present invention includes a terminal apparatus that generates a slip based on slip item data representing a slip item and slip content data representing a slip content corresponding to the slip item; a slip management apparatus including a slip management database that stores the slip content data of the slip generated by the terminal apparatus; and a voucher issuing apparatus that generates a voucher based on the slip content data stored in the slip management database. The terminal apparatus includes a first connection order data storage part that stores first connection order data representing a connection order of the slip content data; a first character string data generating part that connects the slip content data in accordance with the connection order represented by the first connection order data to generate first character string data; and a slip identification code generating part that generates a slip identification code determined uniquely from the first character string data. The voucher issuing apparatus includes a second connection order data storage part that stores second connection order data representing a connection order of the slip content data; a second character string data generating part that connects the slip content data in accordance with the connection order represented by the second connection order data to generate second character string data; and a voucher identification code generating part that generates a voucher identification code determined uniquely from the second character string data. In a case where the slip identification code generated by the slip identification code generating part is matched with the voucher identification code generated by the voucher identification code generating part, validity of the voucher is assured.

According to the validity assurance system of the present invention, the first character string data generating part and the second character string data generating part generate the same character string data when connecting the same slip content data in accordance with the same connection order data. In such a case, the slip identification code generating part and the voucher identification code generating part generate the same identification code. More specifically, in the case where a slip identification code is matched with a voucher identification code, the validity of a voucher is assured. On the other hand, contrary to the above, in the case where the slip identification code is not matched with the voucher identification code, the validity of the voucher is not assured. Consequently, in the case of checking whether or not the contents of the voucher are matched with those of the slip, it is not necessary to check whether or not the contents are matched on an item basis as in the above-mentioned conventional example, and only whether or not the slip identification code is matched with the voucher identification code may be checked. Therefore, the validity of the voucher can be checked easily without incurring time and trouble on a customer side.

Herein, the voucher refers various kinds of documents such as a statement of account, a receipt, an estimate, a statement of delivery, a written order, and an article payment slip, generated based on a slip.

It is preferable that the above-mentioned validity assurance system according to the present invention further includes a two-dimensional code reading apparatus capable of reading a two-dimensional code, wherein the terminal apparatus includes a first two-dimensional code generating part that generates a first two-dimensional code based on the slip identification code, the voucher issuing apparatus includes a second two-dimensional code generating part that generates a second two-dimensional code based on the voucher identification code, the two-dimensional code reading apparatus displays the slip identification code when reading the first two-dimensional code, and the two-dimensional code reading apparatus displays the voucher identification code when reading the second two-dimensional code.

According to the above configuration, the two-dimensional code reading apparatus displays a slip identification code when reading a first two-dimensional code, and displays a voucher identification code when reading a second two-dimensional code. Therefore, the validity of a voucher can be checked easily without incurring time and labor on a customer side.

It is preferable that the above-mentioned validity assurance system according to the present invention further includes an information management apparatus capable of communicating with the two-dimensional code reading apparatus, wherein the information management apparatus includes a data collecting part that collects the slip content data stored in the slip management database and an information management database that stores the slip content data collected by the data collecting part, and the two-dimensional code reading apparatus displays the slip content data stored in the information management database when accessing the information management database.

According to the above configuration, the two-dimensional code reading apparatus displays slip content data stored in the information management database when accessing the information management database. This enables slip content data to be checked easily.

In the validity assurance system according to the present invention, it is preferable that the terminal apparatus includes a slip content data storage part that stores the slip item data and the slip content data, and a connection order data generating part that generates first connection order data representing a connection order of the slip content data, and the connection order data generating part randomly determines the connection order of the slip content data from the slip content data stored in the slip content data storage part, thereby generating the first connection order data.

According to the above configuration, the connection order data generating part is capable of randomly determining the connection order of the slip content data from the slip content data stored in the slip content data storage part, and generate first connection order data.

In above-mentioned validity assurance system according to the present invention, it is preferable that the slip identification code generating part generates the slip identification code for each of the slip content data represented by the first character string data, and the voucher identification code generating part generates the voucher identification code for each of the slip content data represented by the second character string data.

According to the above configuration, merely with reference to a slip identification code, it can be easily grasped which slip content data a slip identification code has been generated from, and merely with reference to a voucher identification code, it can be easily grasped which slip content data a voucher identification code has been generated from.

In order to achieve the above-mentioned object, a validity assurance method according to the present invention realizes a validity assurance system including a terminal apparatus that generates a slip based on slip item data representing a slip item and slip content data representing a slip content corresponding to the slip item; a slip management apparatus including a slip management database that stores the slip content data of the slip generated by the terminal apparatus; and a voucher issuing apparatus that generates a voucher based on the slip content data stored in the slip management database. The method includes a first connection order data storage operation for the terminal apparatus to store first connection order data representing a connection order of the slip content data in a first connection order data storage part; a first character string data generating operation for the terminal apparatus to connect the slip content data to generate first character string data in accordance with the connection order represented by the first connection order data; and a slip identification code generating operation for the terminal apparatus to generate a slip identification code determined uniquely from the first character string data. The method includes a second connection order data storage operation for the voucher issuing apparatus to store second connection order data representing a connection order of the slip content data in a second connection order data storage part; a second character string data generating operation for the voucher issuing apparatus to connect the slip content data in accordance with the connection order represented by the second connection order data to generate second character string data; and a voucher identification code generating operation for the voucher issuing apparatus to generate a voucher identification code determined uniquely from the second character string data, and in a case where the slip identification code generated in the slip identification code generating operation is matched with the voucher identification code generated in the voucher identification code generating operation, validity of the voucher is assured.

In order to achieve the above-mentioned object, a recording medium of the present invention stores a validity assurance program. The validity assurance program contains a first program that causes a first computer to execute processing of generating a slip based on slip item data representing a slip item and slip content data representing a slip content corresponding to the slip item; a second program that causes a second computer to execute slip management database storage processing of storing the slip content data of the slip generated by the first computer in a slip management database; and a third program that causes a third computer to execute processing of generating a voucher based on the slip content data stored in the slip management database. The first program causes the first computer to execute: first connection order data storage processing of storing first connection order data representing a connection order of the slip content data in a first connection order data storage part; first character string data generating processing of connecting the slip content data in accordance with the connection order represented by the first connection order data to generate first character string data; and slip identification code generating processing of generating a slip identification code determined uniquely from the first character string data, and the third program causes the third computer to execute: second connection order data storage processing of storing second connection order data representing a connection order of the slip content data in a second connection order data storage part; second character string data generating processing of connecting the slip content data in accordance with the connection order represented by the second connection order data to generate second character string data; and voucher identification code generating processing of generating a voucher identification code determined uniquely from the second character string data.

In order to achieve the above object, a recording medium of the present invention stores a program that causes a computer to function as the terminal apparatus of the validity assurance system according to claim 1, wherein the program causes the computer to execute: processing of generating a slip based on slip item data representing a slip item and slip content data representing a slip content corresponding to the slip item; first connection order data storage processing of storing first connection order data representing a connection order of the slip content data in a first connection order data storage part; first character string data generating processing of connecting the slip content data in accordance with the connection order represented by the first connection order data to generate first character string data; and slip identification code generating processing of generating a slip identification code determined uniquely from the first character string data.

In order to achieve the above-mentioned object, a recording medium of the present invention stores a program that causes a computer to function as the slip management apparatus of the validity assurance system according to claim 1, wherein the program causes the computer to execute: slip content data acquiring processing of acquiring the slip content data representing the slip content of the slip generated by the terminal apparatus; slip management database storage processing of storing the slip content data acquired in the slip content data acquiring processing in the slip management database; slip content data reading processing of reading the slip content data stored in the slip management database in accordance with a request from the voucher issuing apparatus; and slip content data transmitting processing of transmitting the slip content data read in the slip content data reading processing to the voucher issuing apparatus.

In the validity assurance method and the recording medium storing a program according to the present invention, the same effects as those in the above-mentioned validity assurance system are obtained.

BRIEF DESCRIPTION OF THE DRAWINGS

FIG. 3 is a diagram showing an exemplary data structure of a slip content data storage part in the above-mentioned terminal apparatus.

FIG. 4 is a diagram showing an exemplary data structure of a connection order data storage part in the above-mentioned terminal apparatus.

FIG. 5 is a diagram showing an exemplary data structure of a character string data storage part in the above-mentioned terminal apparatus.

FIG. 6 is a diagram showing an exemplary data structure of a slip identification code storage part in the above-mentioned terminal apparatus.

FIG. 7 is a conceptual diagram showing an exemplary slip printed by a printing part in the above-mentioned terminal apparatus.

FIG. 10 is a conceptual diagram showing an exemplary invoice printed by a printing part in the above-mentioned invoice issuing apparatus.

FIG. 22 is a conceptual diagram showing an exemplary display screen displayed on a display part in the above-mentioned two-dimensional reading apparatus.

FIG. 24 is a conceptual diagram showing another exemplary display screen displayed on the display part.

DETAILED DESCRIPTION OF THE INVENTION

Hereinafter, the present invention will be described in detail by way of more specific embodiments with reference to the drawings.

EMBODIMENT 1

Figure 1:
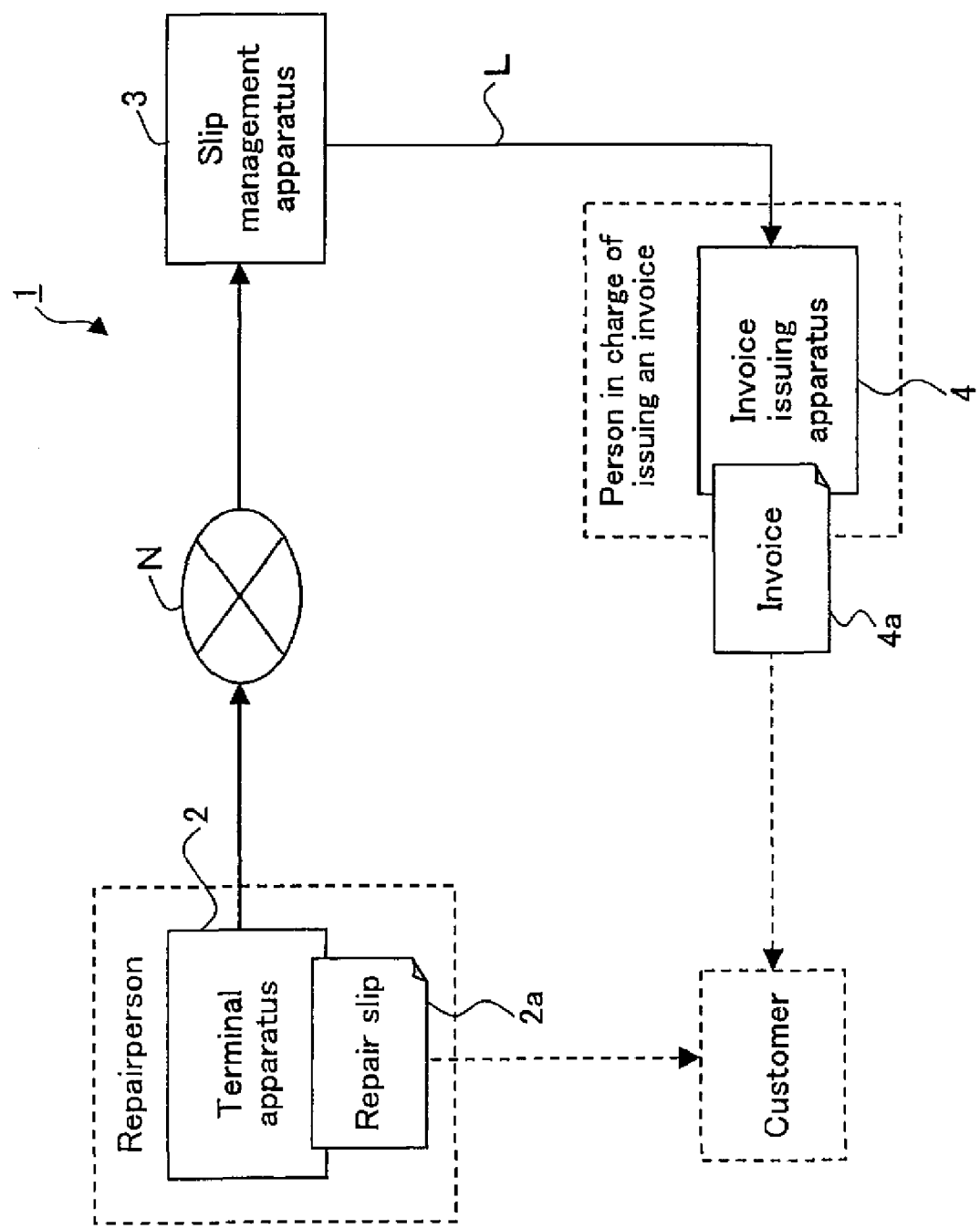
FIG. 1 is a block diagram showing a schematic configuration of a validity assurance system according to Embodiment 1 of the present invention.

FIG. 1 is a block diagram showing a schematic configuration of a validity assurance system 1 according to the present embodiment. More specifically, the validity assurance system 1 according to the present embodiment includes a terminal apparatus 2, a slip management apparatus 3, and an invoice issuing apparatus 4. The terminal apparatus 2 and the slip management apparatus 3 are connected through an Internet N. The slip management apparatus 3 and the invoice issuing apparatus 4 are connected through an Ethernet (Registered Trademark) L. The terminal apparatus 2 is a portable information terminal such as a personal digital assistant (PDA), for example. Furthermore, the terminal apparatus 2 generates a repair slip 2a in accordance with an instruction from a repairperson (operator). The slip management apparatus 3 stores slip item data and slip content data of the repair slip 2a generated by the terminal apparatus 2. The invoice issuing apparatus 4 is placed in an invoice issuing department, and generates an invoice 4a in accordance with an instruction from a person in charge of issuing an invoice, based on the slip content data stored in the slip management apparatus 3. In FIG. 1, for simplicity of explanation, one terminal apparatus 2, one slip management apparatus 3, and one invoice issuing apparatus 4 are illustrated. However, the number of the terminal apparatus 2, the slip management apparatus 3, and the slip issuing apparatus 4 constituting the validity assurance system 1 can be arbitrarily determined. Furthermore, on the validity assurance system 1, a Web server, a proxyserver, a Domain Name System (DNS) server, a Dynamic Host Configuration Protocol (DHCP) server, and the like may be present.

In the present embodiment, as an example, the case will be described where a personal computer held by a customer is broken down, and the customer requests a shop, a manufacturer, or the like to repair the broken-down personal computer. Specifically, the case will be described where a repairperson is dispatched to a customer from a shop, a manufacturer, or the like that has received a request, and the repairperson repairs a broken-down personal computer and generates a repair slip 2a using the terminal apparatus 2.

(Configuration of a Terminal Apparatus)

Figure 2:
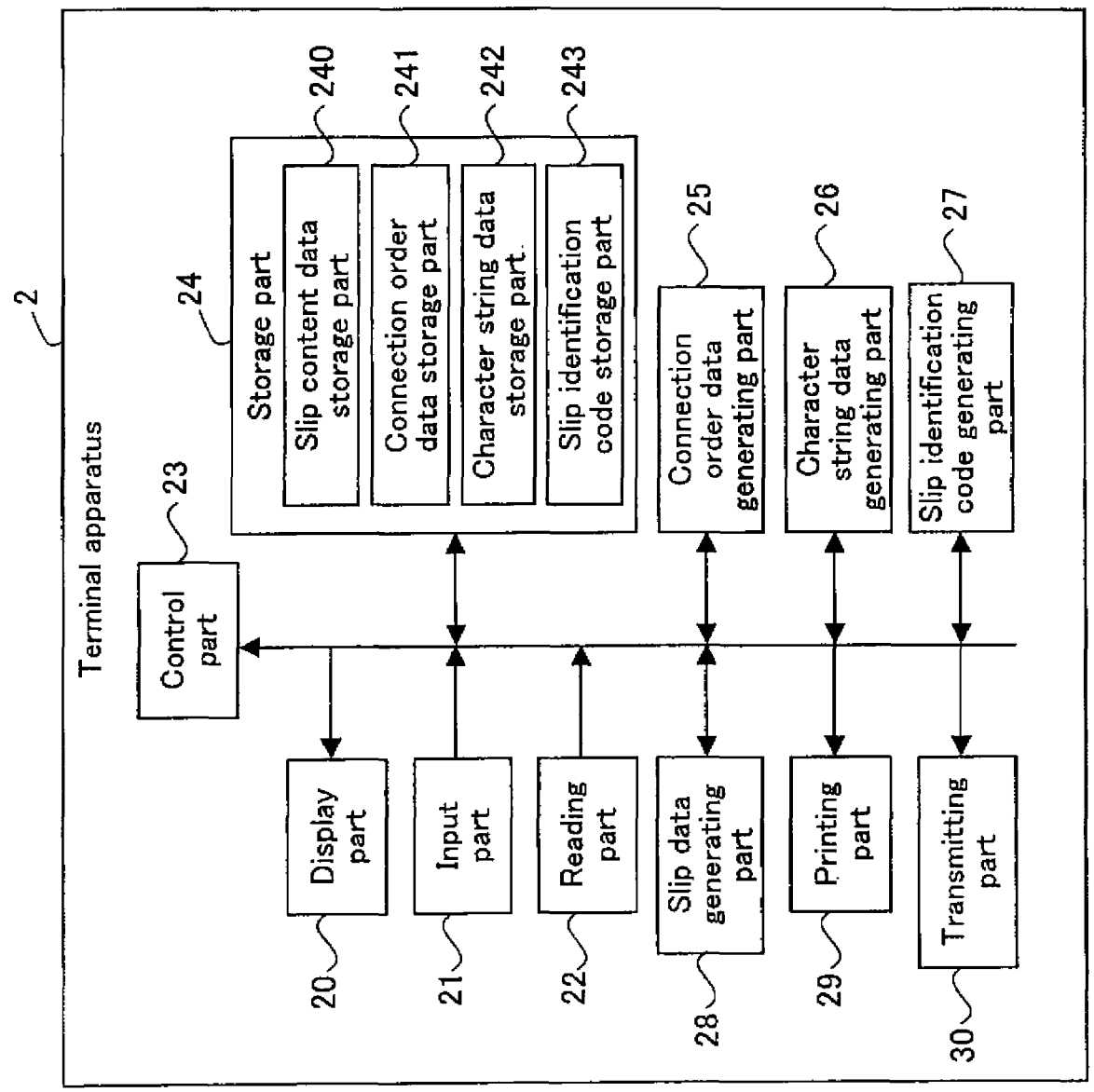
FIG. 2 is a block diagram showing a detailed configuration of a terminal apparatus in the above-mentioned validity assurance system.

FIG. 2 is a block diagram showing a detailed configuration of the terminal apparatus 2. The terminal apparatus 2 includes a display part 20, an input part 21, a reading part 22, a control part 23, a storage part 24, a connection order data generating part 25, a character string data generating part 26, a slip identification code generating part 27, a slip data generating part 28, a printing part 29, and a transmitting part 30.

As the display part 20, a flat display device such as a liquid crystal display or an organic EL display is used preferably so as to configure the terminal apparatus 2 to be thin.

The input part 21 is a touch panel formed on a display screen of the display part 20, for example, in order to input on the display screen of the display part 20. As the touch panel, an analog resistive film type touch panel having high resolution is used preferably. The input part 21 further includes a touch panel controller, and converts an output voltage of the touch panel into input positional information and outputs the input positional information to the control part 23. Furthermore, the input part 21 allows a repairperson to input slip contents corresponding to slip items, for example, with a touch pen. Furthermore, the input part 21 allows a customer to input a customer's signature, for example, with a touch pen. Herein, examples of the slip items include a customer's name, an operator's name, an operation date and time, operation hours, operation contents, an estimate amount, and a signature. The input part 21 may be an arbitrary input device such as a keyboard, a mouse, a ten-key, and a voice recognition apparatus, in place of or in addition to the touch panel.

The reading part 22 is composed of, for example, an optical character reader (OCR), and has a function of reading documents and the like optically. Therefore, the repairperson may generate a repair slip 2a by handwriting, and read the handwritten repair slip 2a with the reading part 22, in place of inputting the repair slip 2a through the input part 21.

The control part 23 is composed of, for example, a CPU or an MPU, and controls the operation of each part of the terminal apparatus 2.

The storage part 24 is composed of a dynamic random access memory (DRAM), a flash erasable and programmable read only memory (EEPROM), a static random access memory (SRAM), and the like. Furthermore, the storage part 24 includes a slip content data storage part 240, a connection order data storage part 241, a character string data storage part 242, and a slip identification code storage part 243.

The slip content data storage part 240 stores slip item IDs identifying slip items, slip item data representing slip items, and slip content data representing slip contents corresponding to slip items input through the input part 21. Therefore, the slip data storage part 240 stores these data as the slip data table 240a, for example, as shown in FIG. 3. The slip data table 240a stores slip item IDs, slip items, and slip contents.

The connection order data storage part (first connection order data storage part) 241 stores connection order data representing the connection order of slip content data. Therefore, the connection order data storage part 241 stores the connection order data as a connection order data table 241a, for example, as shown in FIG. 4. In the example shown in FIG. 4, the connection order data table 241a stores "001-005-

"006-007-009" as a connection order. More specifically the connection order data table 241*a* stores the connection order of slip content data, using slip item IDs identifying slip items.

The character string data storage part 242 stores character string data in which slip item data and slip content data are connected in accordance with the connection order represented by the connection order data stored in the connection order data storage part 241. Therefore, the character string data storage part 242 stores character string data as a character string data table 242*a,* for example, as shown in FIG. 5. In the example shown in FIG. 5, the character string data table 242*a* stores, as character string data, "customer's name; Taro Yamada; operation content phenomenon; a power is turned off several minutes after the boot-up of a computer; operation content cause; breakdown of a CPU fan . . . ".

The slip identification code storage part 243 stores a slip identification code determined uniquely from the character string data stored in the character string data storage part 242. Therefore, the slip identification code storage part 243 stores a slip identification code as a slip identification code table 243*a,* for example, as shown in FIG. 6. In the example shown in FIG. 6, the slip identification code table 243*a* stores "25a368k5ch" as a slip identification code.

In the above, although the example has been described in which the slip content data storage part 240, the connection order data storage part 241, the character string data storage part 242, and the slip identification code storage part 243 store each data in a table format, the present invention is not limited thereto. More specifically, an arbitrary storage format can be used.

The connection order data generating part 25 generates connection order data representing the connection order of slip content data. The connection order data generating part 25 randomly extracts slip item IDs to be connected using random numbers and the like, for example, from the slip item IDs stored in the slip content data storage part 240. The connection order data generating part 25 connects the slip item IDs extracted randomly in the extracted order to generate connection order data. The connection order data generating part 25 stores the generated connection order data in the connection order data storage part 241.

As an example, it is assumed that the connection order data generating part 25 extracts slip item IDs "001", "005", "006", "007", and "009" in this order from the slip item IDs stored in the slip content data storage part 240. The connection order data generating part 25 connects the extracted slip item IDs in the extracted order. Consequently, "001-005-006-007-009" is generated as connection order data. The connection order data generating part 25 stores the generated connection order data "001-005-006-007-009" in the connection order data storage part 241.

More specifically, the connection order data generating part 25 randomly extracts the slip item IDs to be connected from the slip content data storage part 240. Therefore, for example, every time the repair slip 2*a* is generated, different connection order data can be generated.

In the above, although the example has been described in which the connection order data generating part 25 randomly extracts slip item IDs to be connected from the slip content data storage part 240, the present invention is not limited thereto. For example, the connection order data generating part 25 may extract slip item IDs in the order in which they are stored in the slip content data storage part 240, and connect all the slip item IDs to generate connection order data. Furthermore, the connection order data generating part 25 may extract particular slip item IDs from the slip content data storage part 240, in place of or in addition to the random extraction of slip item IDs to be connected from the slip content data storage part 240. Consequently, for example, slip item IDs having higher importance compared with slip item IDs corresponding to an operator's name and operation date and time, such as slip item IDs corresponding to operation contents and an estimate amount can be set to be slip item IDs to be connected at all times. Furthermore, the connection order data generating part 25 may initially connect slip item IDs corresponding to slip items having high importance. Consequently, for example, in the case where the contents of slip items are different between the repair slip 2*a* and the invoice 4*a,* the first character string of a slip identification code to be generated is different from that of an invoice identification code to be generated. Therefore, a customer is likely to notice that the repair slip 2*a* is different from the invoice 4*a*.

The character string data generating part (first character string data generating part) 26 connects slip item data and slip content data in accordance with the connection order represented by the connection order data stored in the connection order data storage part 241, thereby generating character string data (first character string data).

More specifically, in the present embodiment, the character string data generating part 26 reads the connection order data "001-005-006-007-009" stored in the connection order data storage part 241. The character string data generating part 26 extracts slip item data "customer's name" and slip content data "Taro Yamada" stored in the slip content data storage part 240 based on the leading slip item ID "001" of the read connection order data. The character string data generating part 26 connects the extracted "customer's name" and "Taro Yamada". The character string data generating part 26 stores the connected "customer's name" and "Taro Yamada" in the character string data storage part 242.

Next, the character string data generating part 26 extracts the slip item data "operation content phenomenon" and the slip content data "a power is turned off several minutes after the boot-up of a computer" stored in the slip content data storage part 240, based on the second slip item ID "005" of the connection order data. The character string data generating part 26 connects the extracted "operation content phenomenon" and "a power is turned off several minutes after the boot-up of a computer". The character string data generating part 26 stores the connected "operation content phenomenon" and "a power is turned off several minutes after the boot-up of a computer" in the character string data storage part 242. More specifically, in the character string data storage part 242, "customer's name", "Taro Yamada", "operation content phenomenon", and "a power is turned off several minutes after the boot-up of a computer" are stored under the condition of being connected to each other in this order.

The character string data generating part 26 repeats the above process in the order of the slip item IDs "006", "007", and "009". Consequently, the connected slip item data and slip content data are stored as character string data, for example, as shown in FIG. 5, in accordance with the connection order represented by the connection order data.

The slip identification code generating part 27 generates a slip identification code determined uniquely from character string data stored in the character string data storage part 242. More specifically, the slip identification code generating part 27 reads character string data stored in the character string data storage part 242. The slip identification code generating part 27 generates a slip identification code that is a hash value, using a hash function (one-direction abstract function) such as a Message Digest 5 (MD5) with respect to the read character string data. Consequently, a slip identification code composed of alphanumeric characters of a predetermined order of magnitude is generated. However, a slip identification code containing Chinese characters, Japanese syllabary letters, and the like may be generated. The slip identification code generating part 27 stores the generated slip identification code in the slip identification code storage part 243.

Furthermore, it is preferable that the slip identification code generating part 27 generates a slip identification code for each of the slip item data and the slip content data. Specifically, in the present embodiment, "25" of the slip identification code "25a368k5ch" corresponds to the slip item data and the slip content data of the slip item ID "001". Furthermore, "a3" of the slip identification code "25a368k5ch" corresponds to the slip item data and the slip content data of the slip item ID "005". Furthermore, "68" of the slip identification code "25a368k5ch" corresponds to the slip item data and the slip content data of the slip item ID "006". Furthermore, "k5" of the slip identification code "25a368k5ch" corresponds to the slip item data and the slip content data of the slip item ID "007". Furthermore, "ch" of the slip identification code "25a368k5ch" corresponds to the slip item data and the slip content data of the slip item ID "009". Consequently, merely with reference to each order of magnitude of the slip identification code, it can be easily grasped which slip item data and slip content data a slip identification code has been generated from.

In the above, although the example has been described in which the slip identification code generating part 27 generates a slip identification code that is a hash value using a hash function with respect to the character string data stored in the character string data storage part 242, the present invention is not limited thereto. For example, the slip identification code generating part 27 may generate a slip identification code that is a two-dimensional code from the character string data stored in the character string data storage part 242. More specifically, the slip identification code generating part 27 may generate a slip identification code determined uniquely from the character string data stored in the character string data storage part 242.

The slip data generating part 28 generates repair slip data, based on the slip item data and slip content data stored in the slip content data storage part 240 and the slip identification code stored in the slip identification code storage part 243. The repair slip data generated by the slip data generating part 28 is displayed on a display screen of the display part 20.

The printing part 29 prints repair slip data displayed on the display screen of the display part 20 as the repair slip 2a. FIG. 7 shows an example of the repair slip 2a. The repair slip 2a printed from the printing part 29 is passed to a customer. The printing part 29 may print the repair slip 2a in color or in black.

The transmitting part 30 transmits slip item IDs, slip item data, and slip content data stored in the slip content data storage part 240, and connection order data stored in the connection order data storage part 241 to the slip management apparatus through the Internet N. Examples of means for transmitting these data by the transmitting part 30 to the slip management apparatus 3 include means for transmitting electronic mail with slip item IDs, slip item data, slip content data, and connection order data attached thereto, and means for transmitting slip item IDs, slip item data, slip content data, and connection order data by a file transfer protocol (FTP).

In the above, although the example has been described in which the transmitting part 30 transmits slip item IDs, slip item data, slip content data, and connection order data to the slip management apparatus 3 through the Internet N, the present invention is not limited thereto. For example, slip item IDs, slip item data, slip content data, and connection order data may be stored in a storage apparatus such as a digital versatile disk (DVD), a magneto-optical disk (MO), a compact disk (CD), a flexible disk, and a magnetic tape, and the slip management apparatus 3 may read the slip item IDs, slip item data, slip content data, and connection order data directly or indirectly from the storage apparatus. In the above, although the example has been described in which the transmitting part 30 transmits slip item IDs, slip item data, slip content data, and connection order data to the slip management apparatus 3, in the case where slip item IDs and slip item data are previously stored in the slip management apparatus 3, the slip content data and the connection order data may be transmitted, and the slip item IDs and slip item data may not be transmitted.

The terminal apparatus 2 can also be realized by installing a program in an arbitrary computer such as a personal computer. More specifically, the above-mentioned display part 20, input part 21, reading part 22, control part 23, connection order data generating part 25, character string data generating part 26, slip identification code generating part 27, slip data generating part 28, printing part 29, and transmitting part 30 are embodied when a CPU of a computer is operated in accordance with the program for realizing the functions thereof. Thus, a program for realizing the functions of the display part 20, the input part 21 the reading part 22, the control part 23, the connection order data generating part 25, the character string data generating part 26, the slip identification code generating part 27, the slip data generating part 28, the printing part 29, and the transmitting part 30, or a recording medium storing the program are also included in one embodiment of the present invention. Furthermore, the storage part 24 is embodied by a storage apparatus contained in a computer or a storage apparatus accessible from the computer.

(Configuration of a Slip Management Apparatus)

Figure 8:
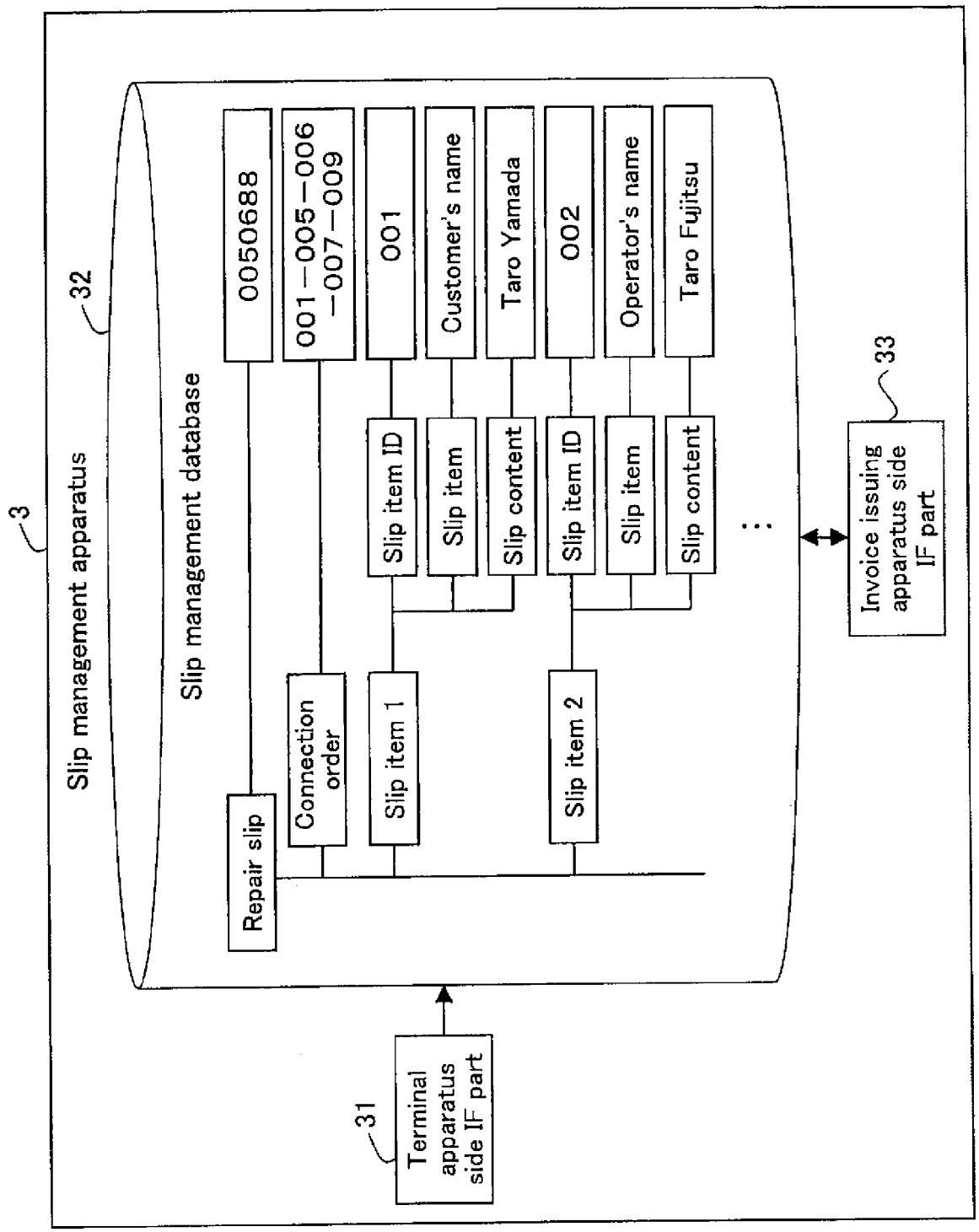
FIG. 8 is a block diagram showing a detailed configuration of a slip management apparatus in the above-mentioned validity assurance system.

FIG. 8 is a block diagram showing a detailed configuration of the slip management apparatus 3. The slip management apparatus 3 includes a terminal apparatus side interface part (terminal apparatus side IF part in the figure) 31, a slip management database 32, and an invoice issuing apparatus side interface part (invoice issuing apparatus side IF part in the figure) 33.

The terminal apparatus side interface part 31 acquires slip item IDs, slip item data, slip content data, and connection order data transmitted from the transmitting part 30 of the terminal apparatus 2. The terminal apparatus side interface part 31 stores the acquired data in the slip management database 32.

The slip management database 32 stores slip item IDs, slip item data, slip content data, and connection order data, for example, in an extensible markup language (XML) format. Therefore, as the slip management database 32, a native XML database capable of handling an XML is preferably used. In the above, although the example has been described in which slip item IDs, slip item data, slip content data, and connection order data are stored in an XML format, they may be stored in a relational database (RDB) format, and an arbitrary storage format can be used.

In the present embodiment the slip management database 32 stores a tag of a repair slip. Furthermore, the slip management database 32 stores a tag of a connection order, a tag of a slip item 1, a tag of a slip item 2, . . . in a lower-order layer of the tag of the repair slip. Furthermore, the slip management database 32 stores a tag of a slip item ID, a tags of a slip item, and a tag of slip contents in a lower-order layer of the tag of the slip item 1. In the same way as the above, in a lower-order layer of the tag of the slip item 2, a tags of a slip item ID, a tag of a slip item, and a tag of slip contents are stored. The tag of the repair slip is associated with a repair slip ID "0050688". The tag of the connection order is associated with connection order data "001-005-006-007-009". The tag of the slip item ID is associated with a slip item ID. The tag of the slip item is associated with slip item data. The tag of the slip contents is associated with slip content data.

The slip management database 32 stores slip item IDs, slip item data, slip content data, and connection order data acquired respectively from a plurality of terminal apparatuses 2. Therefore, the slip management database 32 stores repair slip IDs for identifying repair slips. In the present embodiment, when the terminal apparatus side interface part 31 stores slip item IDs, slip item data, slip content data, and connection order data in the slip management database 32, arbitrary repair slip IDs are stored automatically in the slip management database 32.

The invoice issuing apparatus side interface part 33 reads the slip item IDs, slip item data, slip content data, and connection order data stored in the slip management database 32 in accordance with a request from the invoice issuing apparatus 4. The invoice issuing apparatus side interface part 33 transmits the read data to the invoice issuing apparatus 4 via the Ethernet (Registered Trademark) L.

The slip management apparatus 3 is realized even by installing a program in an arbitrary computer such as a personal computer. More specifically, the above-mentioned terminal apparatus side interface part 31 and invoice issuing apparatus side interface part 33 are embodied when a CPU of a computer is operated in accordance with a program for realizing the functions thereof. Thus, a program for realizing the functions of the terminal apparatus side interface part 31 and the invoice issuing apparatus side interface 33 and a recording medium storing the program are also included in one embodiment of the present invention. Furthermore, the slip management database 32 is embodied by a storage apparatus contained in a computer or a storage apparatus accessible from the computer.

(Configuration of an Invoice Issuing Apparatus)

Figure 9:
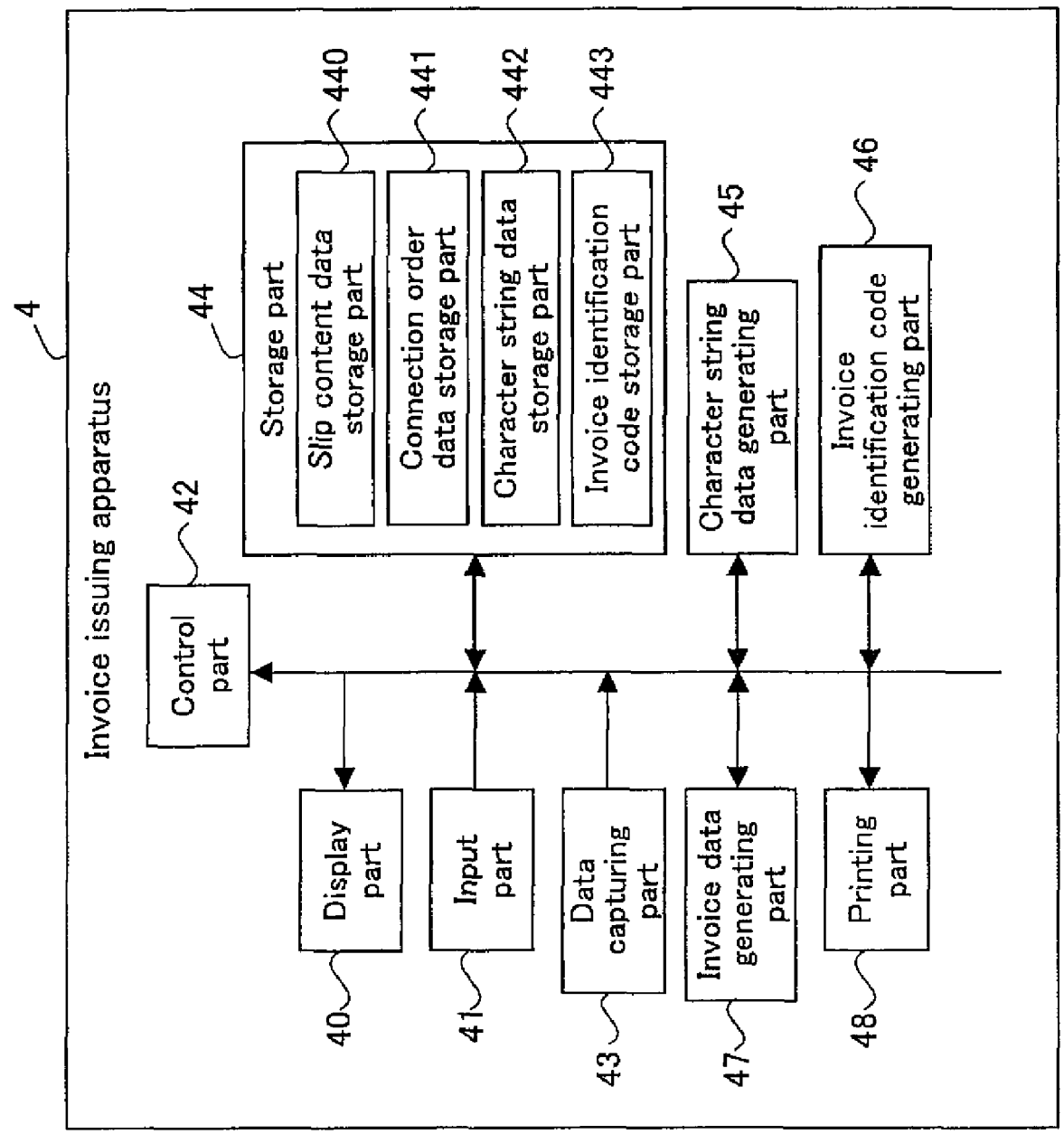
FIG. 9 is a block diagram showing a detailed configuration of an invoice issuing apparatus in the above-mentioned validity assurance system.

FIG. 9 is a block diagram showing a detailed configuration of an invoice issuing apparatus (voucher issuing apparatus) 4. The invoice issuing apparatus 4 includes a display part 40, an input part 41, a control part 42, a data capturing part 43, a storage part 44, a character string data generating part 45, an invoice identification code generating part 46, an invoice data generating part 47, and a printing part 48.

The storage part 44, the character string data generating part 45, the invoice identification code generating part 46, and the invoice data generating part 47 have the same functions as those of the storage part 24, the character string data generating part 26, the slip identification code generating part 27, and the slip data generating part 28 of the terminal apparatus 2. Therefore, regarding the storage part 44, the character string data generating part 45, the invoice identification code generating part 46, and the invoice data generating part 47, the detailed description thereof will be omitted.

The display part 40 is composed of a liquid crystal display, an organic EL display, a plasma display, a CRT display, and the like. The input part 41 is composed of, for example, a keyboard, a mouse, a ten-key, a touch panel, a voice recognition apparatus, or the like. The control part 42 is composed of, for example, a CPU or an MPU, and controls the operation of each part of the invoice issuing apparatus 4.

The data capturing part 43 captures slip item IDs, slip item data, slip content data, and connection order data stored in the slip management database 32 of the slip management apparatus 3. Specifically, the data capturing part 43 requests the invoice issuing apparatus side interface part 33 to acquire the slip item IDs, the slip item data, the slip content data, and the connection order data based on the repair slip ID. The invoice issuing apparatus side interface part 33 reads the slip item IDs, slip item data, slip content data, and connection order data stored in the slip management database 32 based on the repair slip ID. The invoice issuing apparatus side interface part 33 transmits the read slip item IDs, slip item data, slip content data, and connection order data to the data capturing part 43. The data capturing part 43 stores the captured slip item IDs, slip item data, and slip content data in the slip content data storage part 440. Furthermore, the data capturing part 43 stores the captured connection order data in the connection order data storage part 441. In the above, although the example has been described in which the data capturing part 43 captures the slip item IDs, the slip item data, the slip content data, and the connection order data from the slip management database 32, in the case where slip item IDs and slip item data are previously stored in the invoice issuing apparatus 4, the slip content data and the connection order data are captured, and the slip item IDs and the slip item data may not be captured.

The storage part 44 is composed of a DRAM, an FEPROM, an SRAM, and the like in the same way as in the storage part 24 of the terminal apparatus 2. Furthermore, the storage part 44 includes a slip content data storage part 440, a connection order data storage part 441, a character string data storage part 442, and an invoice identification code storage part 443.

The slip content data storage part 440 has the same function as that of the slip content data storage part 240 of the terminal apparatus 2. More specifically, the slip content data storage part 440 stores the slip item IDs, slip item data, and slip content data captured by the data capturing part 43, for example, in the same way as in the example shown in FIG. 3.

The connection order data storage part (second connection order data storage part) 441 has the same function as that of the connection order data storage part 241 of the terminal apparatus 2. More specifically, the connection order data storage part 441 stores connection order data (second connection order data) captured by the data capturing part 43, for example, in the same way as in the example shown in FIG. 4.

The character string data storage part 442 has the same function as that of the character string data storage part 242 of the terminal apparatus 2. More specifically, the character string data storage part 442 stores character string data generated by the character string data generating part 45, for example, in the same way as in the example shown in FIG. 5.

The invoice identification code storage part 443 has the same function as that of the slip identification code storage part 243 of the terminal apparatus 2. More specifically, the invoice identification code storage part 443 stores an invoice identification code generated by the invoice identification code generating part 46, for example, in the same way as in the example shown in FIG. 6.

The character string data generating part (second character string data generating part) 45 has the same function as that of the character string data generating part 26 of the terminal apparatus 2. More specifically, the character string data generating part 45 connects slip item data and slip content data in accordance with the connection order represented by the connection order data stored in the connection order data storage part 441 to generate character string data (second character string data).

The invoice identification code generating part 46 has the same function as that of the slip identification code generating part 27 of the terminal apparatus 2. More specifically, the invoice identification code generating part 46 generates an invoice identification code determined uniquely from character string data stored in the character string data storage part 442. It is preferable that the invoice identification code generating part 46 generates an invoice identification code for each slip item data and slip content data in the same way as in the slip identification code generating part 27.

The invoice data generating part 47 has the same function as that of the slip data generating part 28 of the terminal apparatus 2. More specifically, the invoice data generating part 47 generates invoice data, based on the slip item data and the slip content data stored in the slip content data storage part 440, and the invoice identification code stored in the invoice identification code storage part 443. The invoice data generated by the invoice data generating part 47 is displayed on a display screen of the display part 40.

The printing part 48 prints the invoice data displayed on the display screen of the display part 40 as the invoice 4a. FIG. 10 shows an example of the invoice 4a. The invoice 4a printed by the printing part 48 is sent from a person in charge of issuing an invoice to a customer, for example, by mail. The printing part 48 may print the invoice 4a in color or in black. Furthermore, the printing part 48 may be configured outside in a hardware manner with respect to the invoice issuing apparatus 4.

The above-mentioned invoice issuing apparatus 4 may also be realized by installing a program in an arbitrary computer such as a personal computer. More specifically, the above-mentioned display part 40, input part 41, control part 42, data capturing part 43, character string data generating part 45, invoice identification code generating part 46, invoice data generating part 47, and printing part 48 are embodied when a CPU of a computer is operated in accordance with a program for realizing the functions thereof. Thus, a program for realizing the functions of the display part 40, the input part 41, the control part 42, the data capturing part 43, the character string data generating part 45, the invoice identification code generating part 46, the invoice data generating part 47, and the printing part 48, or a recording medium storing the program are also included in one embodiment of the present invention. Furthermore, the storage part 44 is embodied by a storage apparatus contained in a computer and a storage apparatus accessible from the computer.

(Operation Example of a Terminal Apparatus)

Next, the processing of the terminal apparatus 2 in the validity assurance system 1 according to the above configuration will be described with reference to FIG. 11.

Figure 11:
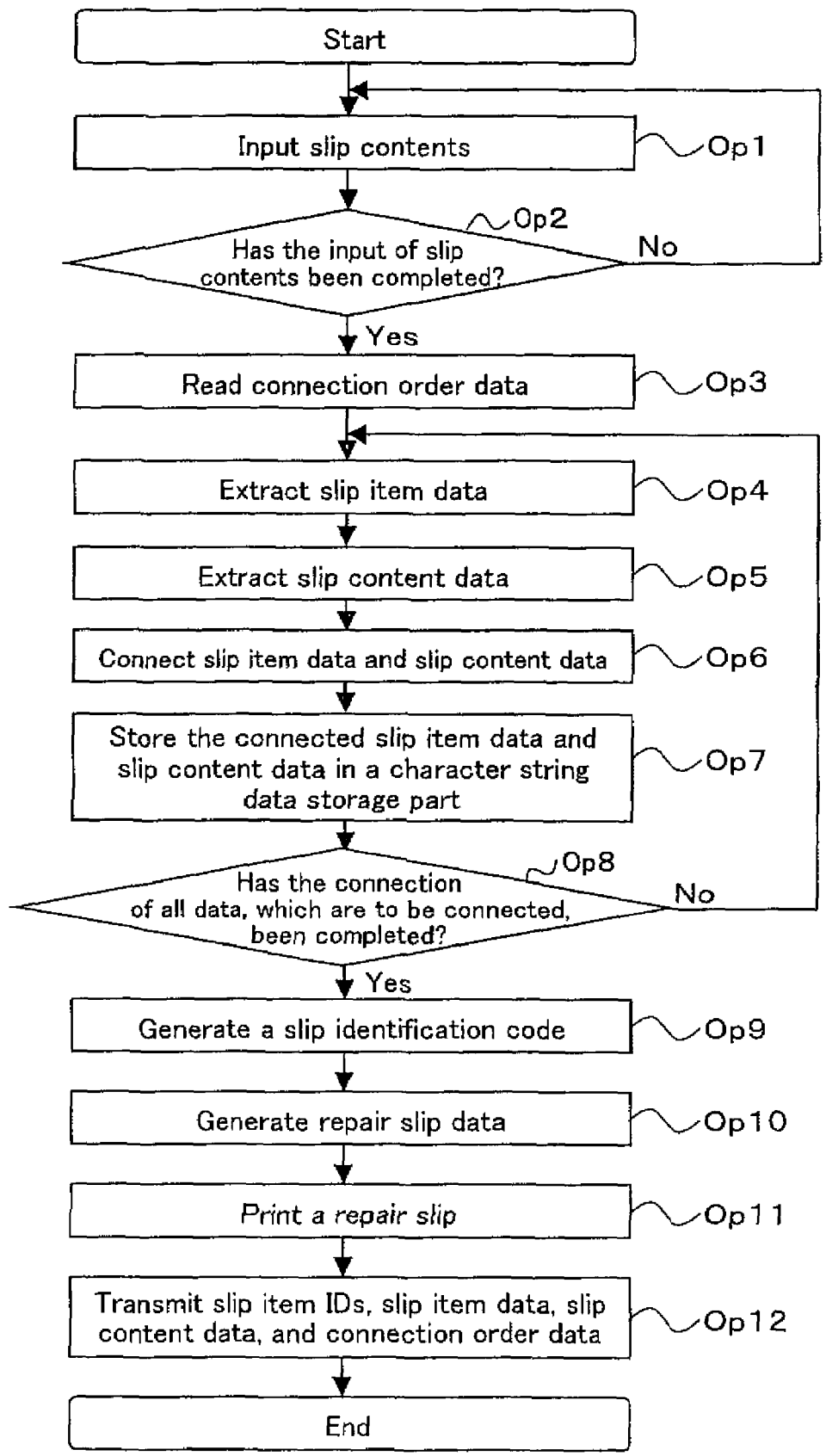
FIG. 11 is a flowchart illustrating an operation of the above-mentioned terminal apparatus.

FIG. 11 is a flowchart illustrating an outline of the processing of the terminal apparatus 2. More specifically, as shown in FIG. 11, a repairperson inputs slip contents corresponding to slip items by the input part 21 (Op1). A customer writes a signature by the input part 21 unless there is a mistake in the slip contents input by the repairperson. The input slip contents are stored in the slip content data storage part 240 as slip content data. If the input of the slip contents is completed (YES in Op2), the character string data generating part 26 reads connection order data stored in the connection order data storage part 241 (Op3). On the other hand, if an input of the slip contents is not completed (NO in Op2), the process returns to Operation 1.

The character string data generating part 26 extracts slip item data stored in the slip content data storage part 240 based on the slip item IDs represented by the connection order data (Op4). Furthermore, the character string data generating part 26 extracts slip content data stored in the slip content data storage part 240, based on the slip item IDs represented by the connection order data (Op5). The character string data generating part 26 connects the extracted slip item data and slip content data (Op6). The character string data generating part 26 stores the connected slip item data and slip content data in the character string data storage part 242 (Op7). More specifically, the slip item data and slip content data stored in the character string data storage part 242 are used as character string data.

Herein, if the connection is completed regarding all the slip item IDs represented by the connection order data (YES in Op8), the slip identification code generating part 27 generates slip identification code determined uniquely from character string data stored in the character string data storage part 242 (Op9). The slip identification code generating part 27 stores the generated slip identification code in the slip identification code storage part 243. On the other hand, if the connection is not completed regarding all the slip item IDs represented by the connection order data (NO in Op8), the processing in Operations 4 to 7 is repeated.

Next, the slip data generating part 28 generates repair slip data, based on the slip item data and the slip content data stored in the slip content data storage part 240 and the slip identification code stored in the slip identification code storage part 243 (Op10). The repair slip data generated by the slip data generating part 28 is displayed on a display screen of the display part 20.

Then, the printing part 29 prints repair slip data displayed on the display screen of the display part 20 as the repair slip 2a in accordance with the instruction from the repairperson (Op11). The repair slip 2a printed by the printing part 29 is passed from the repairperson to the customer. Then, in accordance with the instruction from the repairperson, the transmitting part 30 transmits the slip item IDs, the slip item data, and the slip content data stored in the slip content data storage part 240, and the connection order data stored in the connection order data storage part 241 to the slip management apparatus 3 through the Internet N (Op12).

(Operation Example of a Slip Management Apparatus)

Next, the processing of the slip management apparatus 3 in the validity assurance system 1 will be described with reference to FIG. 12.

Figure 12:
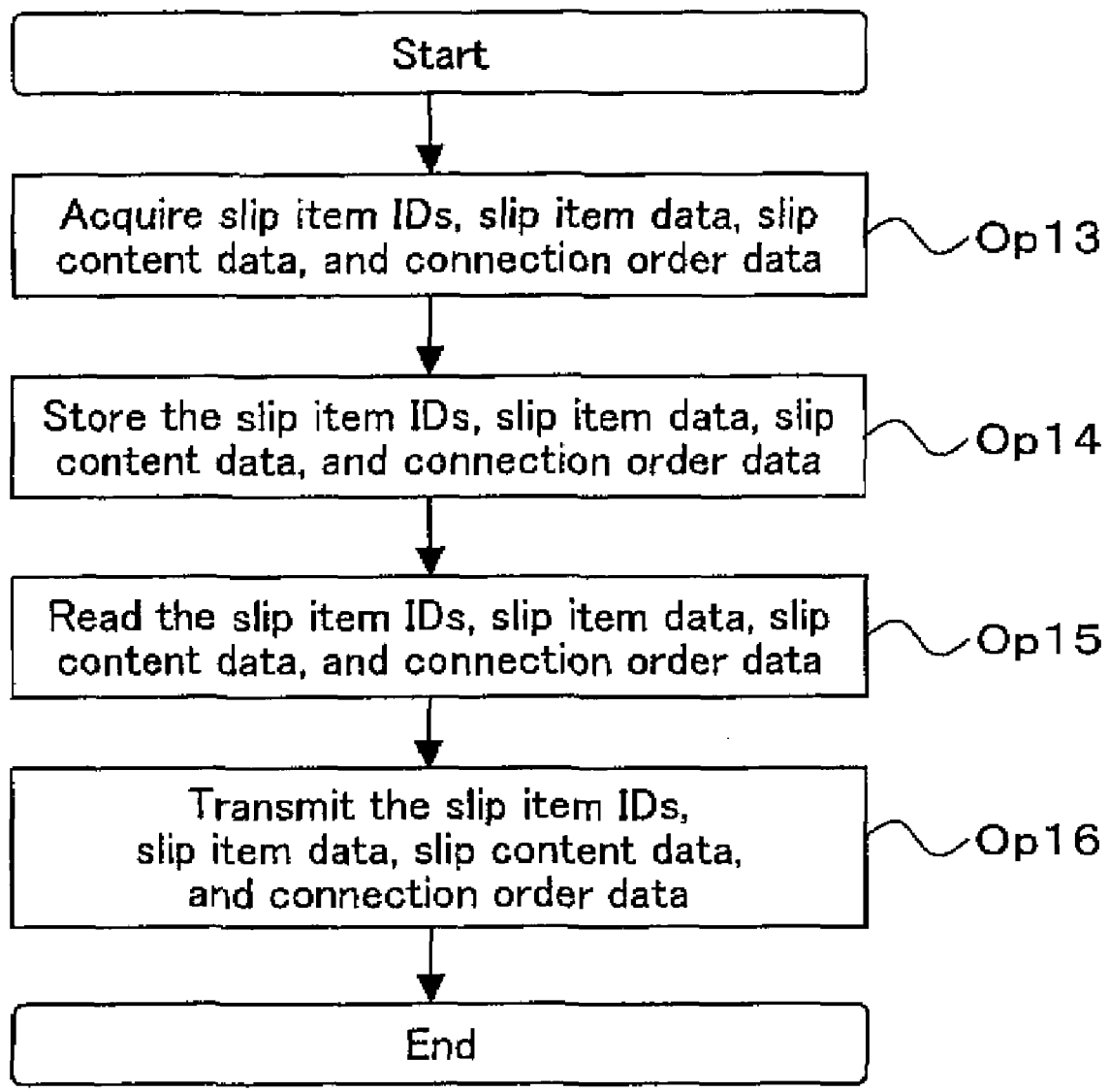
FIG. 12 is a flowchart illustrating an operation of the above-mentioned slip management apparatus.

FIG. 12 is a flowchart showing an outline of the processing of the slip management apparatus 3. More specifically, as shown in FIG. 12, the terminal apparatus side interface part 31 acquires the slip item IDs, slip item data, slip content data, and connection order data transmitted in Operation 12 in FIG. 11 (Op13). The terminal apparatus side interface part 31 stores the slip item IDs, slip item data, slip content data, and connection order data acquired in Operation 13 in the slip management database 32 (Op14).

After that, the invoice issuing apparatus side interface part 33 receives a request for acquiring the slip item IDs, slip item data, slip content data, and connection order data from the invoice issuing apparatus 4, based on the repair slip ID. The invoice issuing apparatus side interface part 33 reads the slip item IDs, slip item data, slip content data, and connection order data stored in the slip management database 32 based on the repair slip ID (Op15). The invoice issuing apparatus side interface part 33 transmits the read slip item IDs, slip item data, slip content data, and connection order data to the invoice issuing apparatus 4 (Op16).

(Operation Example of an Invoice Issuing Apparatus)

Next, the processing of the invoice issuing apparatus 4 in the validity assurance system 1 will be described with reference to FIG. 13.

Figure 13:
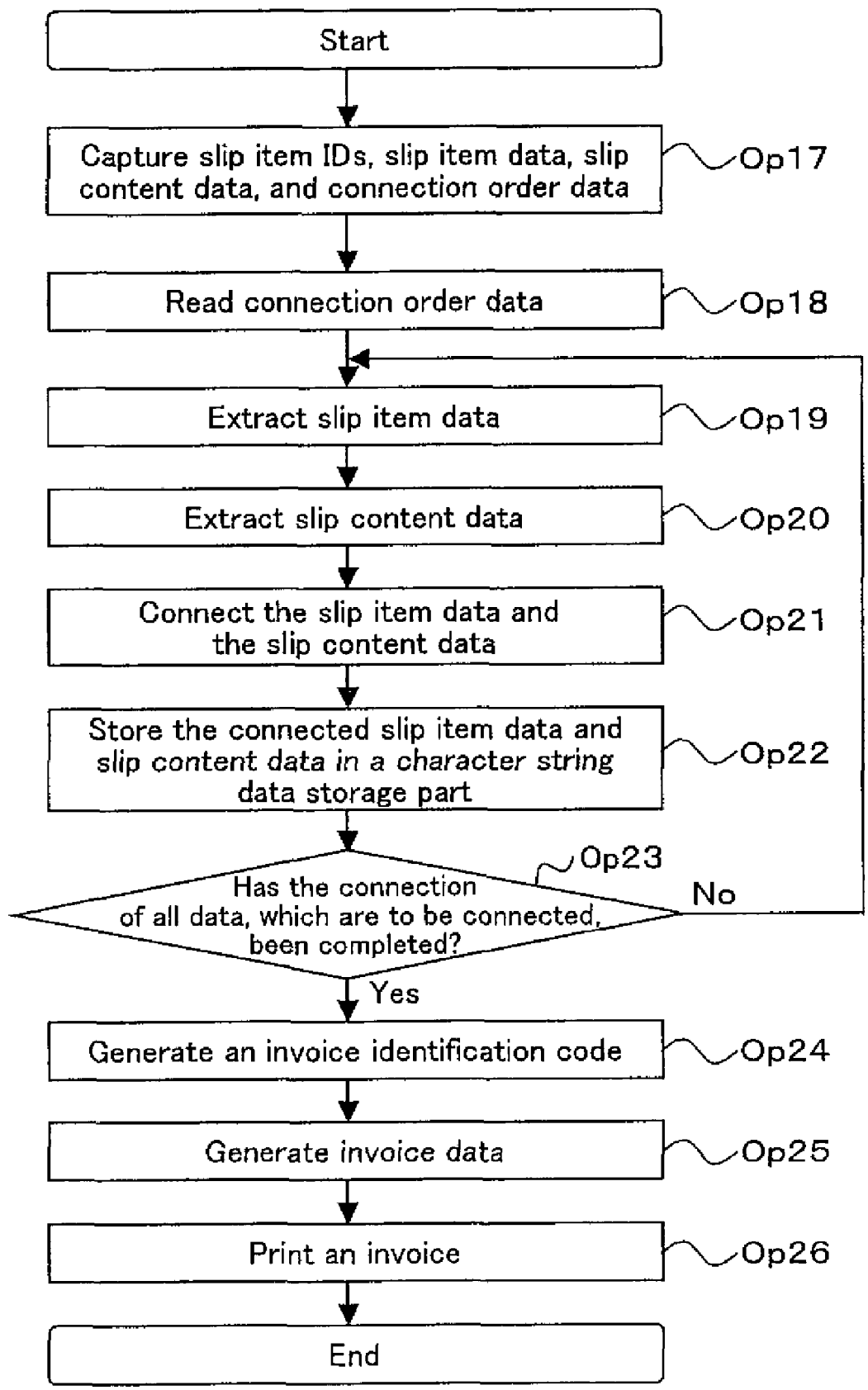
FIG. 13 is a flowchart illustrating an operation of the above-mentioned invoice issuing apparatus.

FIG. 13 is a flowchart illustrating an outline of the processing of the invoice issuing apparatus 4. More specifically, as shown in FIG. 13, the data capturing part 43 captures the slip item IDs, slip item data, slip content data, and connection order data transmitted in Operation 16 in FIG. 12 (Op17). The data capturing part 43 stores the captured slip item IDs, slip item data, and slip content data in the slip content data storage part 440. Furthermore, the data capturing part 43 stores the captured connection order data in the connection order data storage part 441.

The character string data generating part 45 reads the connection order data stored in the connection order data storage part 441 (Op18). The character string data generating part 45 extracts the slip item data stored in the slip content data storage part 440, based on the slip item IDs represented by the connection order data (Op19). Furthermore, the character string data generating part 45 extracts the slip content data stored in the slip content data storage part 440, based on the slip item ID represented by the connection order data (Op20). The character string data generating part 45 connects the extracted slip item data and slip content data (Op21). The character string data generating part 45 stores the connected slip item data and slip content data in the character string data storage part 442 (Op22). More specifically, the slip item data and slip content data stored in the character string data storage part 442 are used as character string data.

Herein, if the connection is completed regarding all the slip item IDs represented by the connection order data (YES in Op23), the invoice identification code generating part 46 generates an invoice identification code determined uniquely from the character string data stored in the character string data storage part 442 (Op24). The invoice identification code generating part 46 stores the generated invoice identification code in the invoice identification code storage part 443. On the other hand, if the connection is not completed regarding all the slip item IDs represented by the connection order data (NO in Op23), the processing in Operations 19 to 22 is repeated.

Next, the invoice data generating part 47 generates invoice data, based on the slip item data and slip content data stored in the slip content data storage part 440, and the invoice identification code stored in the invoice identification code storage part 443 (Op25). The invoice data generated by the invoice data generating part 29 is displayed on the display screen of the display part 40.

Then, in accordance with the instruction from a person in charge of issuing an invoice, the printing part 48 prints the invoice data displayed on the display screen of the display part 40 as the invoice 4a (Op26). The invoice 4a printed by the printing part 48 is sent from the person in charge of issuing an invoice to a customer, for example, by mail.

The customer checks whether or not the slip identification code printed on the repair slip 2a with the invoice identification code printed on the invoice 4a. In the case where the slip identification code is matched with the invoice identification code, the invoice 4a is generated based on the slip content data from which the repair slip 2a held by the customer has been generated. More specifically the validity of the invoice 4a is assured. On the other hand, in the case where the slip identification code is not matched with the invoice identification code, the invoice 4a is not generated based on the slip content data from which the repair slip 2a held by the customer has been generated. More specifically, the validity of the invoice 4a is not assured. Herein, if the validity of the invoice 4a is assured, the customer pays a charge amount (repair fee) to a shop or a manufacturer that has conducted the repair, based on the invoice 4a sent from the person in charge of issuing the invoice.

As described above, according to the validity assurance system 1 according to the present embodiment, when the character string data generating part 26 of the terminal apparatus 2 and the character string data generating part 45 of the invoice issuing apparatus 4 generate the same character string data, when the same slip content data are connected in accordance with the same connection order data. In such a case, the slip identification code generating part 27 and the invoice identification code generating part 46 generate the same identification code. More specifically, in the case where the slip identification code is matched with the voucher identification code, the validity of the invoice 4a is assured. On the other hand, contrary to the above, in the case where the slip identification code is not matched with the invoice identification code, the validity of the invoice 4a is not assured. Consequently, in the case of checking whether or not the contents of the invoice 41 are matched with those of the repair slip 2a, it is not necessary to check whether or not the contents are matched on an item basis as in the above-mentioned conventional example, and only whether or not the slip identification code is matched with the voucher identification code may be checked. Therefore, the validity of the invoice 41 can be checked easily without any time and trouble of the customer.

EMBODIMENT 2

In Embodiment 1, the example has been described in which the terminal apparatus generates a slip identification code, and the invoice issuing apparatus generates an invoice identification code. More specifically, the example has been described in which whether or not a slip identification code is matched with an invoice identification code is checked. In contrast, in Embodiment 2, an example will be described in which the terminal apparatus generates a two-dimensional code based on a slip identification code, and the invoice issuing apparatus generates a two-dimensional code based on an invoice identification code. More specifically, an example will be described in which a generated two-dimensional code is read in a two-dimensional code reading apparatus, and whether or not a slip identification code is matched with an invoice identification code is checked.

Figure 14:
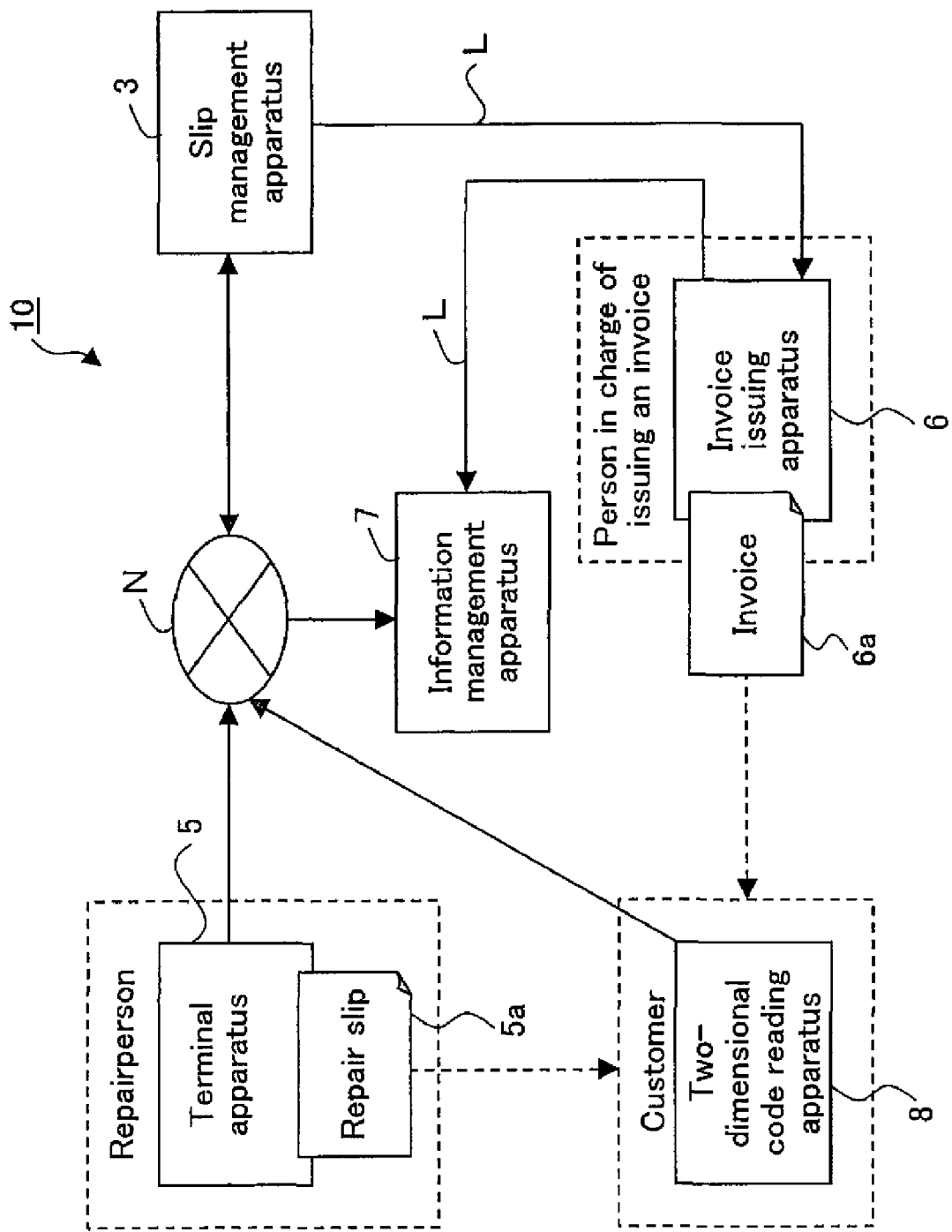
FIG. 14 is a block diagram showing a schematic configuration of a validity assurance system according to Embodiment 2 of the present invention.

FIG. 14 is a block diagram showing a schematic configuration of the validity assurance system 10 according to the present embodiment. In FIG. 14, the configurations having the same functions as those in FIG. 1 are denoted with the same reference numerals as those therein, and the detailed description thereof will be omitted.

More specifically, the validity assurance system 10 according to the present embodiment includes a terminal apparatus 5 and an invoice issuing apparatus 6 in place of the terminal apparatus 2 and the invoice issuing apparatus 4 shown in FIG. 1. Furthermore, in addition to the validity assurance system 1 shown in FIG. 1, the validity assurance system 10 further includes an information management apparatus 7 and a two-dimensional code reading apparatus 8. The invoice issuing apparatus 6 and the information management apparatus 7 are connected through the Ethernet (Registered Trademark) L.

(Configuration of a Terminal Apparatus)

Figure 15:
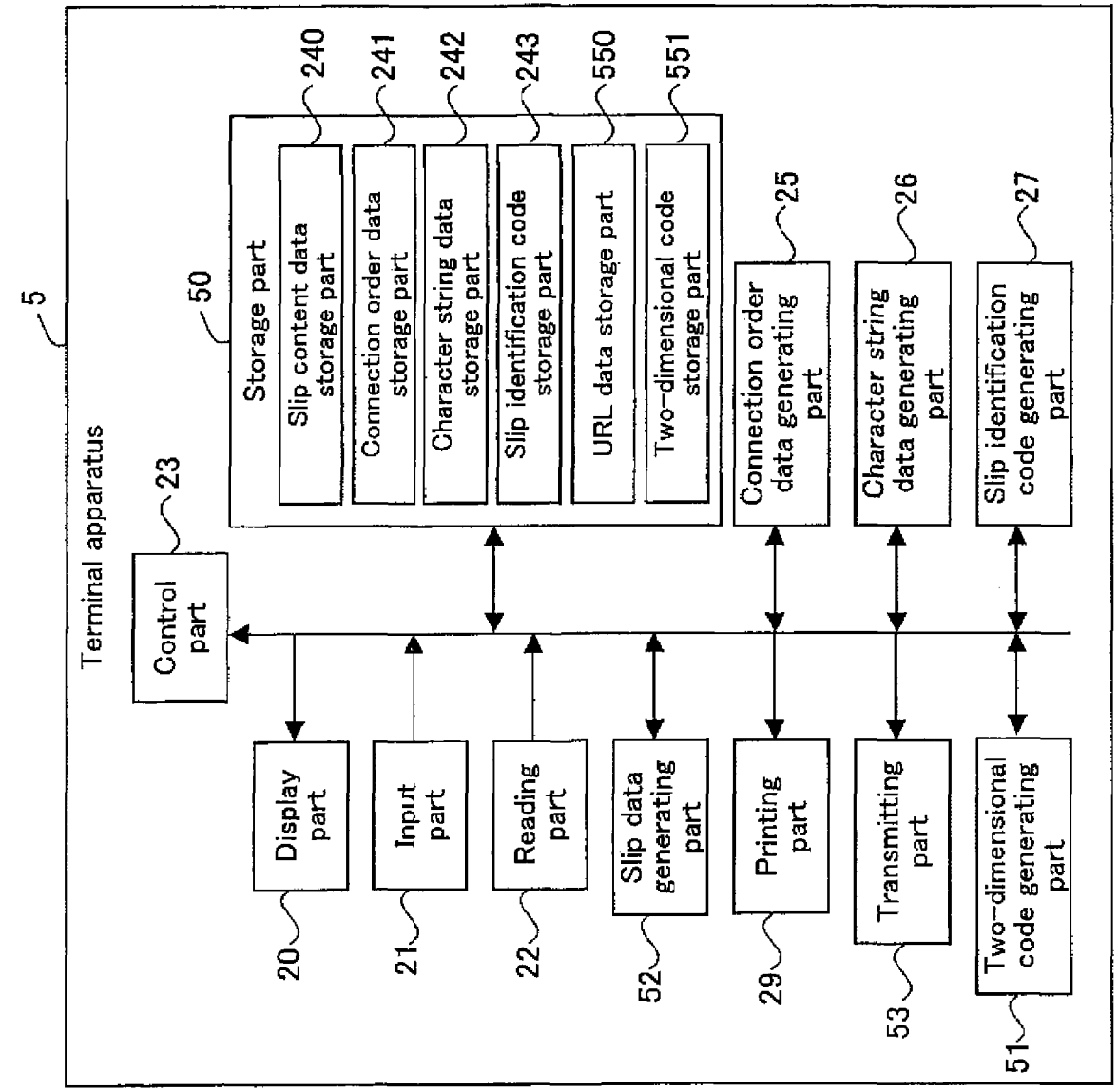
FIG. 15 is a block diagram showing a detailed configuration of a terminal apparatus in the validity assurance system.

FIG. 15 is a block diagram showing a detailed configuration of the terminal apparatus 5. The terminal apparatus 5 shown in FIG. 15 further includes a URL data storage part 550 and a two-dimensional code storage part 551 in a storage part 50, in addition to the terminal apparatus 2 shown in FIG. 2.

Furthermore, the terminal apparatus 5 shown in FIG. 15 further includes a two-dimensional code generating part 51 in addition to the terminal apparatus 2 shown in FIG. 2. Furthermore, the terminal apparatus 5 shown in FIG. 15 includes a slip data generating part 52 and a transmitting part 53 in place of the slip data generating part 28 and the transmitting part 30 shown in FIG. 2.

Figure 16:
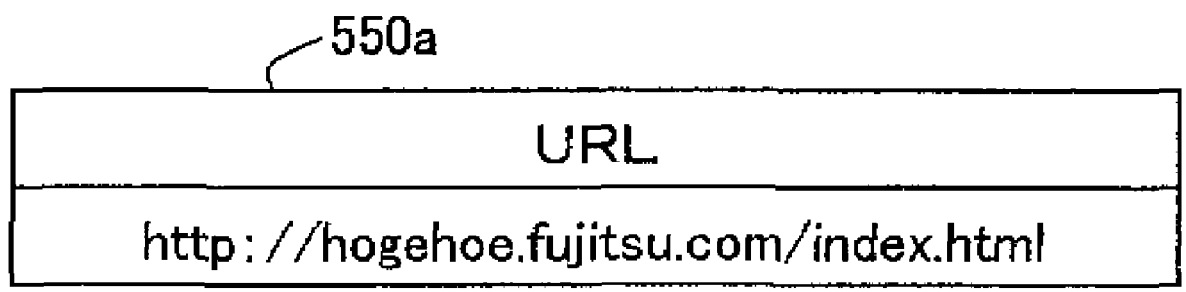
FIG. 16 is a diagram showing an exemplary data structure of a URL data storage part in the above-mentioned terminal apparatus.

The URL data storage part 550 stores uniform resource locator (URL) data that is address information on the Internet N of the information management apparatus 7. Therefore, the URL data storage part 550 stores the URL data as a URL data table 550a, for example, as shown in FIG. 16. In the example shown in FIG. 16, the URL data table 550a stores "http://hogehoe.fujitsu.com/index.html" as the URL data. The URL data storage part 550 uses an arbitrary storage format.

The two-dimensional code storage part 551 stores a two-dimensional code generated by the two-dimensional code generating part 51. The two-dimensional code storage part 551 stores a two-dimensional code, for example, in a bitmap format.

The two-dimensional code generating part (first two-dimensional code generating part) 51 generates a two-dimensional code (first two-dimensional code), based on the URL data stored in the URL data storage part 550, the connection order data stored in the connection order data storage part 241, and the slip identification code stored in the slip identification code storage part 243.

Specifically, in the present embodiment, the two-dimensional code generating part 51 reads the URL data "http://hogehoe.fujitsu.com/index. html" stored in the URL data storage part 550, the connection order data "001-005-006-007-009" stored in the connection order data storage part 241, and the slip identification code "25a368k5ch" stored in the slip identification code storage part 243. The two-dimensional code generating part 51 combines the read data to generate combined data "http://hogehoe.fujitsu. com/index.html=001-005-006-007-009=25a368k5ch". The two-dimensional code generating part 51 generates a two-dimensional code from the combined data "http://hogehoe.fujitsu.com/index.html=001-005-006-007-009=25a368k5ch". The two-dimensional code generating part 51 stores the generated two-dimensional code in the two-dimensional code storage part 551.

The slip data generating part 52 generates repair slip data based on the slip item data and slip content data stored in the slip content data storage part 240 and the two-dimensional code stored in the two-dimensional code storage part 551 to generate repair slip data. The repair slip data generated by the slip data generating part 52 is displayed on the display screen of the display part 20.

Figure 17:
FIG. 17 is a conceptual diagram showing an exemplary slip printed by the printing part in the above-mentioned terminal apparatus.

The printing part 29 prints the repair slip data displayed on the display screen of the display part 20 as a repair slip 5a. FIG. 17 shows an example of the repair slip 5a. The repair slip 5a printed by the printing part 29 is passed to a customer. When the repair slip 5a shown in FIG. 17 is compared the repair slip 2a shown in FIG. 7, only important items such as a customer's name and an estimate amount are printed.

In addition to the functions of the transmitting part 30 shown in FIG. 1, the transmitting part 53 further has a function of transmitting the slip identification code stored in the slip identification code storage part 243 to the information management apparatus 7 through the Internet N. The information management apparatus 7 stores the transmitted slip identification code in the information management database 71 of the information management apparatus 7 described later.

The above-mentioned terminal apparatus 5 can also be realized by installing a program in an arbitrary computer such as a personal computer. More specifically, the above-mentioned two-dimensional code generating part 51, slip data generating part 52, and transmitting part 53 are embodied when a CPU of a computer is operated in accordance with the program for realizing the functions thereof. Thus, a program for realizing the functions of the two-dimensional code generating part 51, the slip data generating part 52, and the transmitting part 53, or a recording medium storing the program are also included in one embodiment of the present invention. Furthermore, the URL data storage part 550 and the two-dimensional code storage part 551 are embodied by a storage apparatus contained in a computer or a storage apparatus accessible from the computer.

(Configuration of an Invoice Issuing Apparatus)

Figure 18:
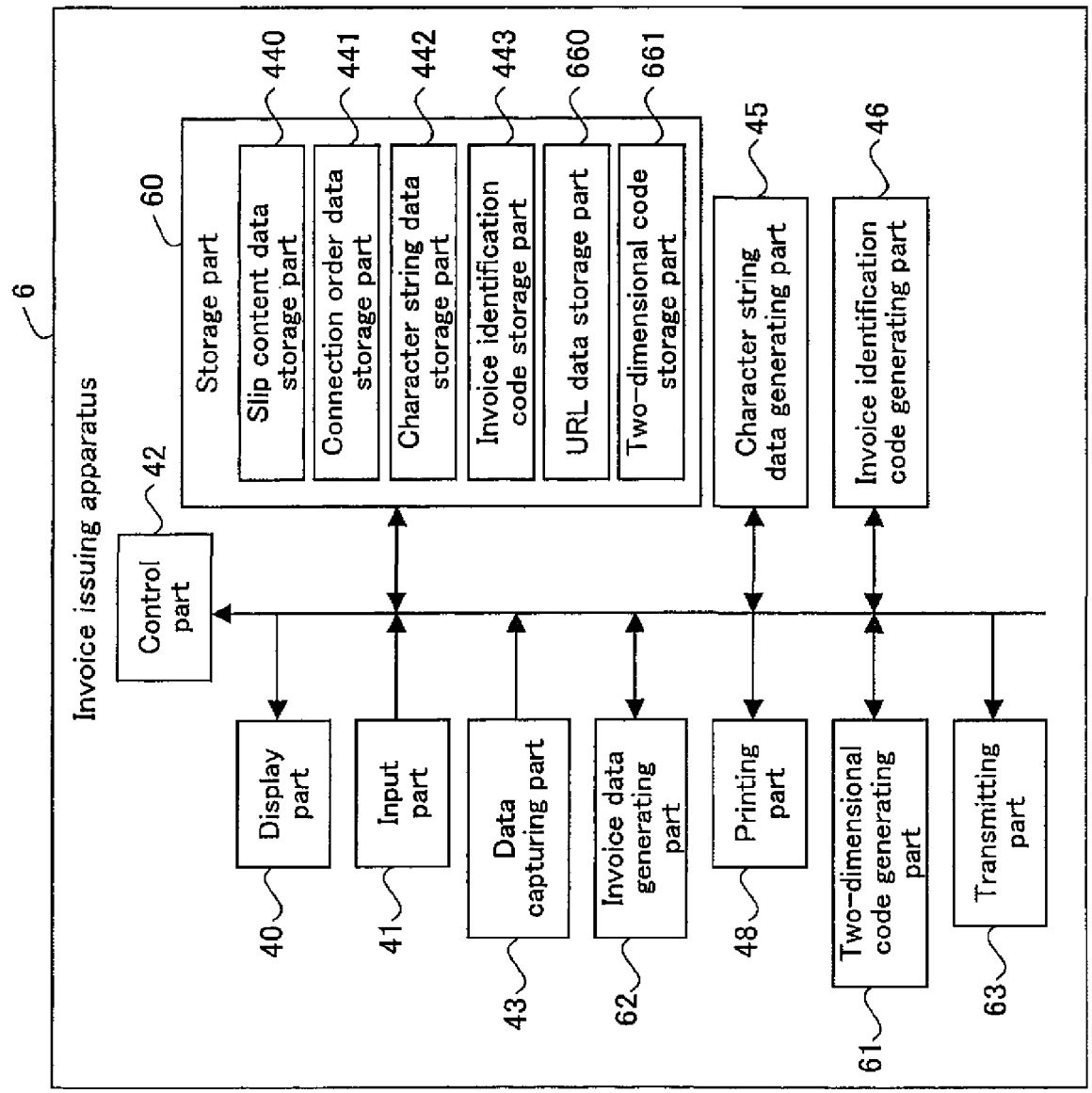
FIG. 18 is a block diagram showing a detailed configuration of an invoice issuing apparatus in the validity assurance system.

FIG. 18 is a block diagram showing a detailed configuration of the invoice issuing apparatus 6. The invoice issuing apparatus 6 shown in FIG. 18 further includes a URL data storage part 660 and a two-dimensional code storage part 661 in a storage part 60, in addition to the invoice issuing apparatus 4 shown in FIG. 9. Furthermore, in addition to the invoice issuing apparatus 4 shown in FIG. 9, the invoice issuing apparatus 6 shown in FIG. 18 further includes a two-dimensional code generating part 61 and a transmitting part 63. Furthermore, the invoice issuing apparatus 6 shown in FIG. 18 includes an invoice data generating part 62, in place of the invoice data generating part 47 shown in FIG. 9.

The URL data storage part 660, the two-dimensional code storage part 661, the two-dimensional code generating part 61, and the invoice data generating part 62 have the same functions as those of the URL data storage part 550, the two-dimensional code storage part 551, the two-dimensional code generating part 51, and the slip data generating part 52 of the terminal apparatus 5. Therefore, regarding the URL data storage part 660, the two-dimensional storage part 661, the two-dimensional code generating part 61, and the invoice data generating part 62, the detailed description thereof will be omitted.

The URL data storage part 660 has the same function as that of the URL data storage part 660 of the terminal apparatus 5. More specifically, the URL data storage part 660 stores the URL data that is address information on the Internet N of the information management apparatus 7, for example, in the same way as in the example shown in FIG. 16.

The two-dimensional code storage part 661 has the same function as that of the two-dimensional code storage part 551 of the terminal apparatus 5. More specifically, the two-dimensional code storage part 661 stores a two-dimensional code generated by the two-dimensional code generating part 61.

The two-dimensional code generating part (second two-dimensional code generating part) 61 has the same function as that of the two-dimensional generating part 51 of the terminal apparatus 5. More specifically, the two-dimensional code generating part 61 generates a two-dimensional code (second two-dimensional code), based on the URL data stored in the URL data storage part 660, the connection order data stored in the connection order data storage part 441, and the invoice identification code stored in the invoice identification code storage part 443.

The invoice data generating part 62 has the same function as that of the slip data generating part 52 of the terminal apparatus 5. More specifically, the invoice data generating part 62 generates invoice data, based on the slip item data and the slip content data stored in the slip content data storage part 440, and the two-dimensional code stored in the two-dimensional code storage part 661. The invoice data generated by the invoice data generating part 62 is displayed on the display screen of the display part 40.

Figure 19:
FIG. 19 is a conceptual diagram showing an exemplary invoice printed by the printing part in the above-mentioned invoice issuing apparatus.

The printing part 48 prints the invoice data displayed on the display screen of the display part 40 as an invoice 6a. FIG. 19 shows an example of the invoice 6a. The invoice 6a printed by the printing part 48 is sent from a person in charge of issuing an invoice to a customer, for example, by mail. When the invoice 6a shown in FIG. 19 is compared with the invoice 4a shown in FIG. 10, only important items such as a customer's name and a charge amount are printed.

The transmitting part 63 transmits the invoice identification code stored in the invoice identification code storage part 443 to the information management apparatus 7 through the Ethernet (Registered Trademark) L. The information management apparatus 7 stores the transmitted invoice identification code in the information management database 71 of the information management apparatus 7.

The above-mentioned invoice issuing apparatus 6 is also realized by installing a program in an arbitrary computer such as a personal computer. More specifically, the above-mentioned two-dimensional code generating part 61, invoice data generating part 62, and transmitting part 63 are embodied when a CPU of a computer is operated in accordance with the program for realizing the functions thereof. Thus, a program for realizing the functions of the two-dimensional code generating part 61, the invoice data generating part 62, and the transmitting part 63, or a recording medium storing the program are also included in one embodiment of the present invention. Furthermore, the URL data storage part 660 and the two-dimensional code storage part 661 are embodied by a storage apparatus contained in a computer or a storage apparatus accessible from the computer.

(Configuration of an Information Management Apparatus)

Figure 20:
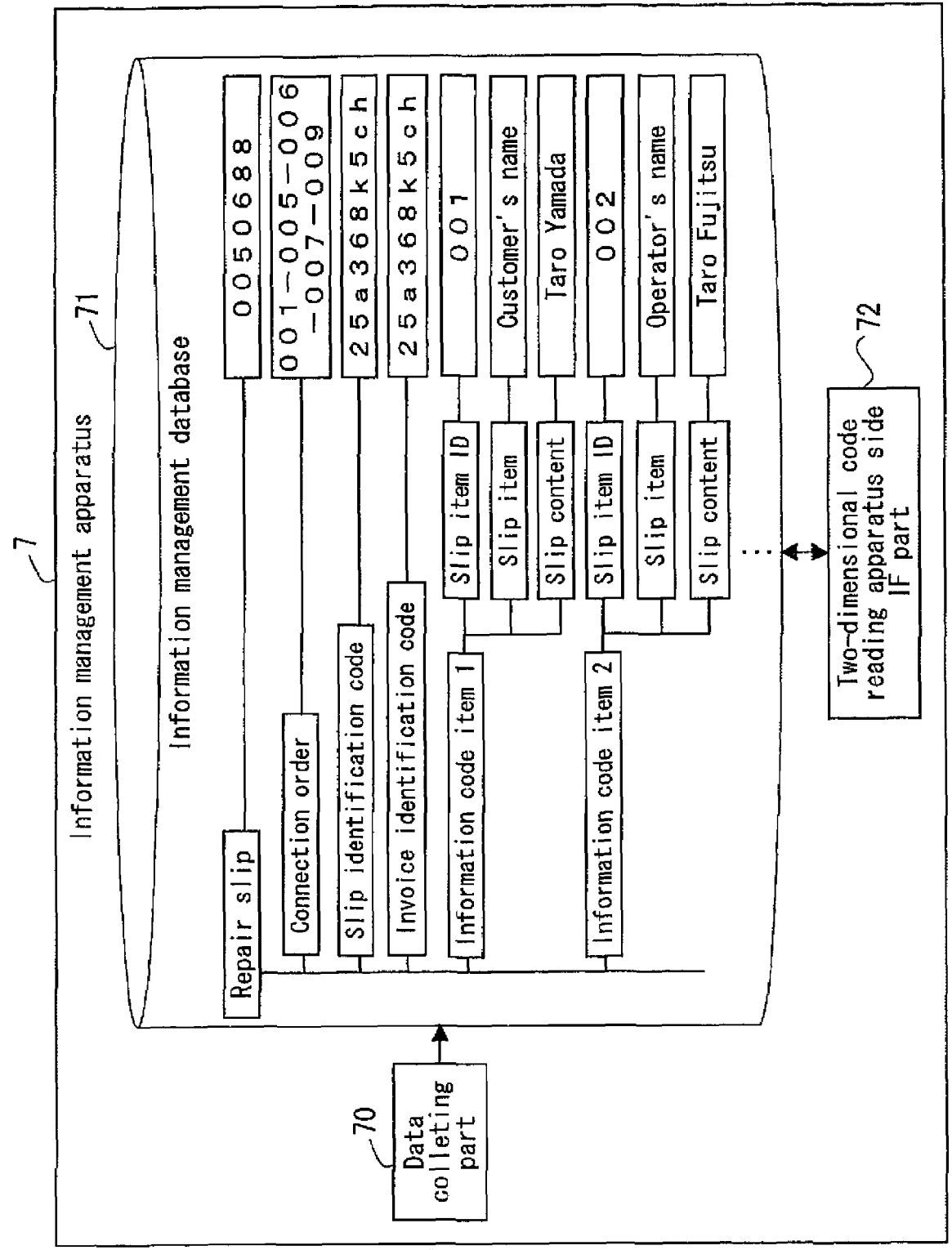
FIG. 20 is a block diagram showing a detailed configuration of an information management apparatus in the validity assurance system.

FIG. 20 is a block diagram showing a detailed configuration of the information management apparatus 7. The information management apparatus 7 includes a data collecting part 70, an information management database 71, and a two-dimensional code reading apparatus side interface part (two-dimensional code reading apparatus side IF part in the figure) 72. The information management apparatus 7 has a function as a Web server.

The data collecting part 70 collects data stored in the slip management database 32 of the slip management apparatus 3. Specifically, the data collecting part 70 collects repair slip IDs, slip item IDs, slip item data, slip content data, and connection order data stored in the slip management database 32. The data collecting part 70 stores these collected data in the information management database 71.

Furthermore, the data collecting part 70 acquires a slip identification code transmitted from the transmitting part 53 of the terminal apparatus 5. The data collecting part 70 stores the acquired slip identification code in the information management database 71. Furthermore, the data collecting part 70 acquires the invoice identification code transmitted from the transmitting part 63 of the invoice issuing apparatus 6. The data collecting part 70 stores the acquired invoice identification code in the information management database 71.

The information management database 71 stores the repair slip IDs, the connection order data, the slip identification code, the invoice identification code, the slip item IDs, the slip item data, and the slip content data, for example, in an XML format. Therefore, as the information management database 71, a native XML database capable of handling an XML is preferably used. In the above, although the example has been described in which the repair slip IDs, the connection order data, the slip identification code, the invoice identification code, the slip item IDs, the slip item data, and the slip content data are stored in an XML format, they may be stored in an RDB format, and an arbitrary storage format can be used.

In the present embodiment, the information management database 71 stores a tag of a repair slip. Furthermore, the slip management database 71 stores a tag of a connection order, a tag of a slip identification code, a tag of an invoice identification code, a tag of an information code item 1, a tag of an information code item 2, . . . in a lower-order layer of the tag of the repair slip. Furthermore, the information management database 71 stores a tag of a slip item ID, a tag of a slip item, and a tag of slip contents in a lower-order layer of the tag of the information code item 1. In the same way as the above, in a lower-order layer of the tag of the information code item 2, a tag of a slip item ID, a tag of a slip item, and a tag of slip contents are stored. The tag of the repair slip is associated with a repair slip ID "0050688". The tag of the connection order is associated with connection order data "001-005-006-007-009". The tag of the slip identification code is associated with a slip identification code "25a368k5ch". The tag of the invoice identification code is associated with the invoice identification code "25a368k5ch". The tag of the slip item ID is associated with a slip item ID. The tag of the slip item is associated with slip item data. The tag of the slip contents is associated with slip content data.

The two-dimensional code reading apparatus side interface part 72 reads the slip item IDs, slip item data, and slip content data stored in the information management database 71 in accordance with a request from the two-dimensional code reading apparatus 8. The two-dimensional code reading apparatus side interface part 72 sends the read slip item ID, slip item data, and slip content data to the two-dimensional code reading apparatus 8 through the Internet N.

The above-mentioned information management apparatus 7 is also realized by installing a program in an arbitrary computer such as a personal computer. More specifically the above-mentioned data collecting part 70 and two-dimensional code reading apparatus side interface part 72 are embodied when a CPU of a computer is operated in accordance with the program for realizing the functions thereof. Thus, a program for realizing the functions of the data collecting part 70 and the two-dimensional code reading apparatus side interface part 72 or a recording medium storing the program is also included in one embodiment of the present invention. Furthermore, the information management database 71 is embodied by a storage apparatus contained in a computer or a storage apparatus accessible from the computer.

(Configuration of a Two-Dimensional Code Reading Apparatus)

Figure 21:
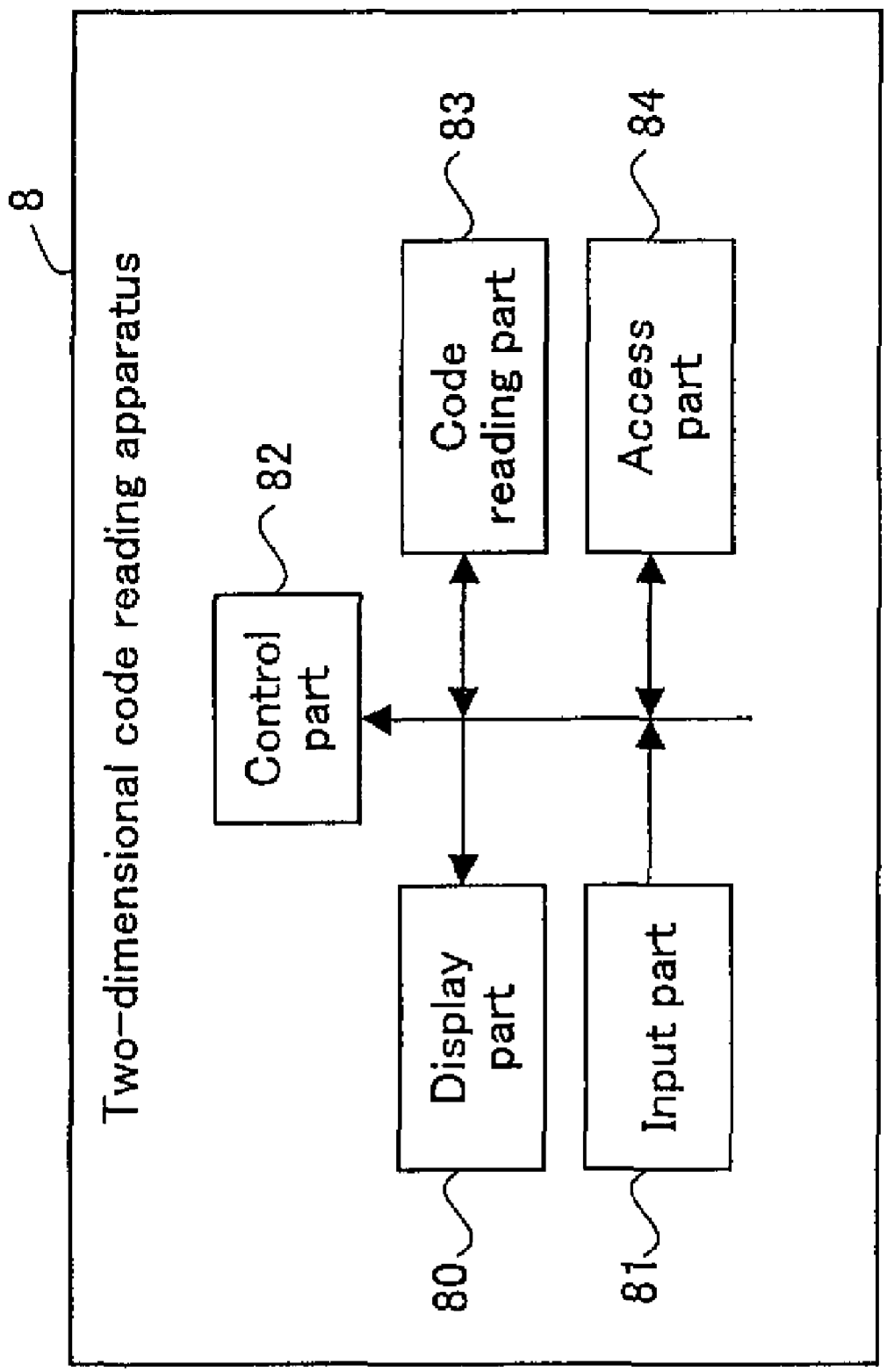
FIG. 21 is a block diagram showing a detailed configuration of a two-dimensional code reading apparatus in the above-mentioned validity assurance system.

FIG. 21 is a block diagram showing a detailed configuration of the two-dimensional code reading apparatus 8. The two-dimensional code reading apparatus 8 includes a display part 80, an input part 81, a control part 82, a code reading part 83, and an access part 84. The two-dimensional code reading apparatus 8 is composed of a mobile telephone or a personal computer having a function of reading a two-dimensional code.

The display part 80 is composed of a liquid crystal display, an organic EL display, a plasma display, a CRT display, or the like. The input part 81 is composed of, for example, a keyboard, a mouse, a ten-key, a touch panel, a voice recognition apparatus, or the like. The control part 82 is composed of, for example, a CPU or an MPU, and controls the operation of each part of the two-dimensional code reading apparatus 8.

The code reading part 83 has a function of reading a two-dimensional code printed on the repair slip 5a and the invoice 6a. Specifically, the code reading part 83 reads information recorded in a two-dimensional code from the arrangement of white cells and black cells of the two-dimensional code. For example, in the case where the code reading part 83 reads a two-dimensional code printed on the repair slip 5a, the result read by the code reading part 83 is displayed on the display part 80, for example, as shown in FIG. 22. In the example shown in FIG. 22, the display part 80 displays the URL "http://hogehoe.fujitsu.com/index.html" of the information management apparatus 7, the connection order data "001-005-006-007-009", and the slip identification code "25a368k5ch". Therefore, the code reading part 83 reads the two-dimensional code printed on the repair slip 5a and the invoice 6a, whereby the customer can check whether or not the slip identification code is identical with the invoice identification code in the display part 80.

Figure 23:
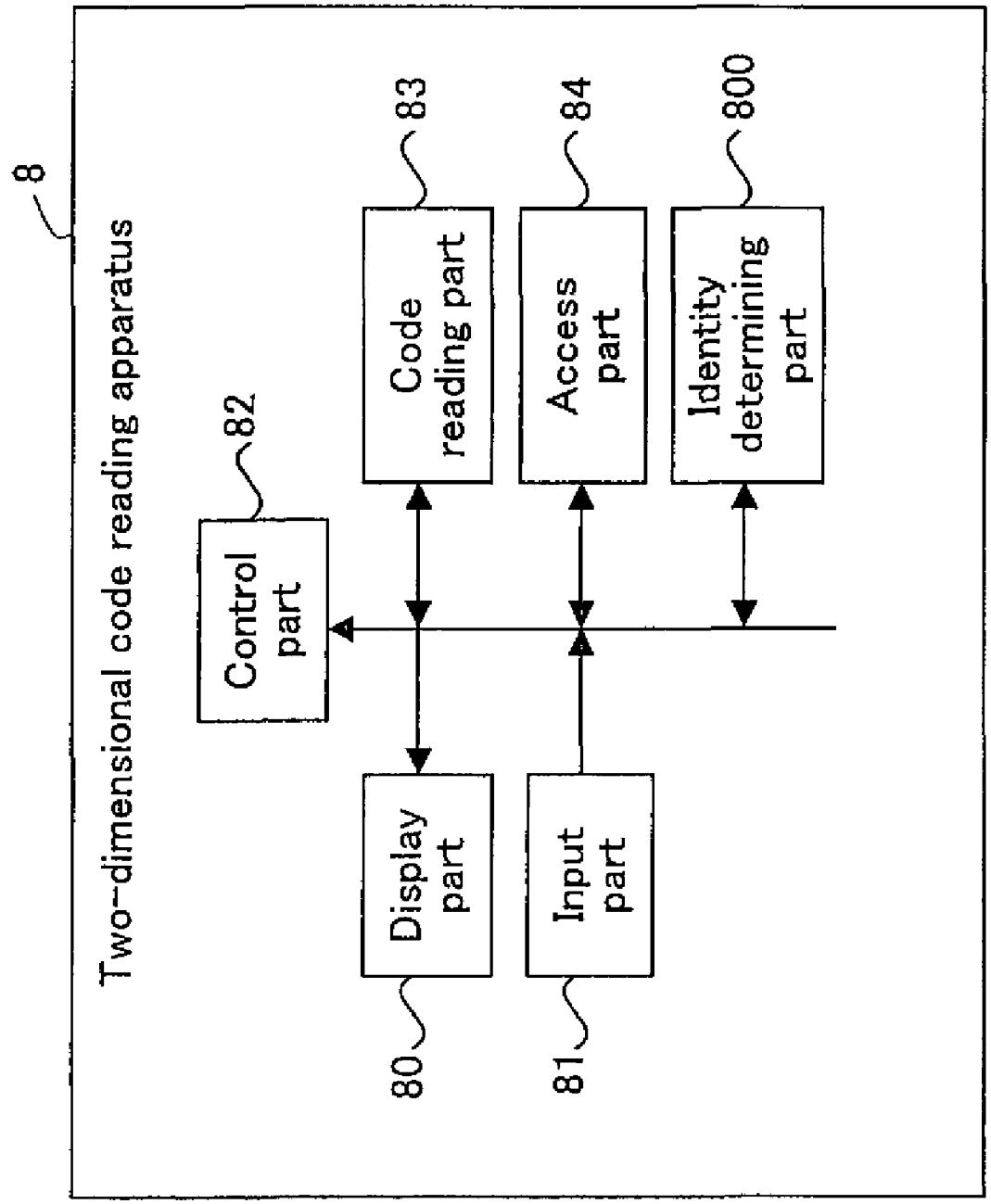
FIG. 23 is a block diagram showing another exemplary detailed configuration in the above-mentioned two-dimensional code reading apparatus.

In the above, although the example has been described in which the customer checks whether or not the slip identification code is identical with the invoice identification code displayed on the display part 80, the present invention is not limited thereto. For example, as shown in FIG. 23, the two-dimensional code reading apparatus 8 includes an identity determining part 800 in the two-dimensional code reading apparatus 8, and the identify determining part 800 may determine whether or not the slip identification code is identical with the invoice identification code. More specifically, when the code reading part 83 reads the two-dimensional codes printed on the repair slip 5a and the invoice 6a, the identity determining part 800 determines whether or not the slip identification code is identical with the invoice identification code. The result determined by the identity determining part 800 is displayed on the display part 80.

The access part 84 has a function of accessing the information management apparatus 7 on the Internet N, based on the URL that is address information. Specifically, in the present embodiment, when the URL "http://hogehoe.fujitsu.com/index.html" of the information management apparatus 7 displayed on the display part 80 is designated by the input part 81, the access part 84 accesses the information management apparatus 7 based on the designated URL. When the access part 84 accesses the information management apparatus 7, the display part 80 displays a screen represented by the URL of the information management apparatus 7.

When the URL of the information management apparatus 7 is designated by the input part 81, for example, as shown in FIG. 24, the slip item data and the slip content data stored in the information management apparatus 7 are displayed. The access part 84 may be able to access the information management apparatus 7 when a user ID and a password are input through the input part 81.

The two-dimensional code reading apparatus 8 is also realized by installing a program in an arbitrary computer such as a personal computer. More specifically, the above-mentioned display part 80, input part 81, control part 82, code reading part 83, and access part 84 are embodied when a CPU of a computer is operated in accordance with the program for realizing the functions thereof. Thus, a program for realizing the functions of the display part 80, the input part 81, the control part 82, the code reading part 83, and the access part 84 or a recording medium storing the program are also included in one embodiment of the present invention.

(Operation Example of a Terminal Apparatus)

Figure 25:
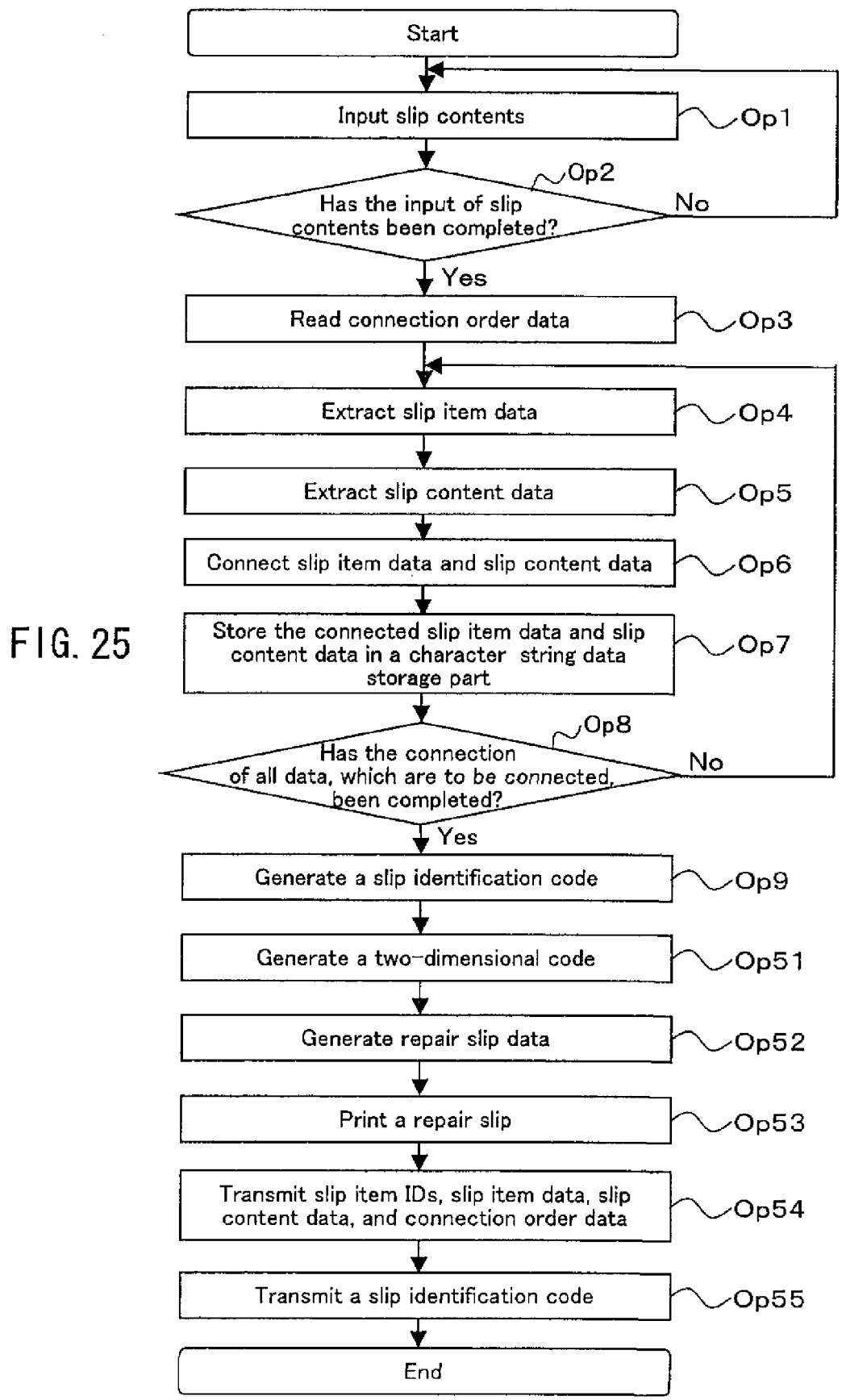
FIG. 25 is a flowchart showing an operation of the above-mentioned terminal apparatus.

Next, the processing of the terminal apparatus 5 in the validity assurance system 10 according to the above configuration will be described with reference to FIG. 25. In FIG. 25, portions showing the same processing as that in FIG. 11 are denoted with the same reference numerals as those therein, and the detailed description thereof will be omitted.

FIG. 25 is a flowchart showing an outline of the processing of the terminal apparatus 5. In the processing shown in FIG. 25, Operations 1 to 9 are the same as those shown in FIG. 11.

After Operation 9, the two-dimensional code generating part 51 generates a two-dimensional code, based on the URL data stored in the URL data storage part 550, the connection order data stored in the connection order data storage part 241, and the slip identification code stored in the slip identification code storage part 243 (Op51).

Next, the slip data generating part 52 generates repair slip data, based on the slip item data and the slip content data stored in the slip content data storage part 240 and the two-dimensional code stored in the two-dimensional code storage part 551 (Op52). The repair slip data generated by the slip data generating part 52 is displayed on the display screen of the display part 20.

Then, the printing part 29 prints the repair slip data displayed on the display screen of the display part 20 as the repair slip 5a in accordance with the instruction from the repairperson (Op53). The repair slip 5a printed by the printing part 29 is passed from the repairperson to the customer. Then, the transmitting part 53 transmits the slip item IDs, slip item data, and slip content data stored in the slip content data storage part 240, and the connection order data stored in the connection order data storage part 241 to the slip management apparatus 3 through the Internet N, in accordance with the instruction from the repairperson (Op54). Furthermore, the transmitting part 53 transmits the slip identification code stored in the slip identification code storage part 243 to the information management apparatus 7 in accordance with the instruction from the repairperson (Op55).

(Operation Example of an Invoice Issuing Apparatus).

Figure 26:
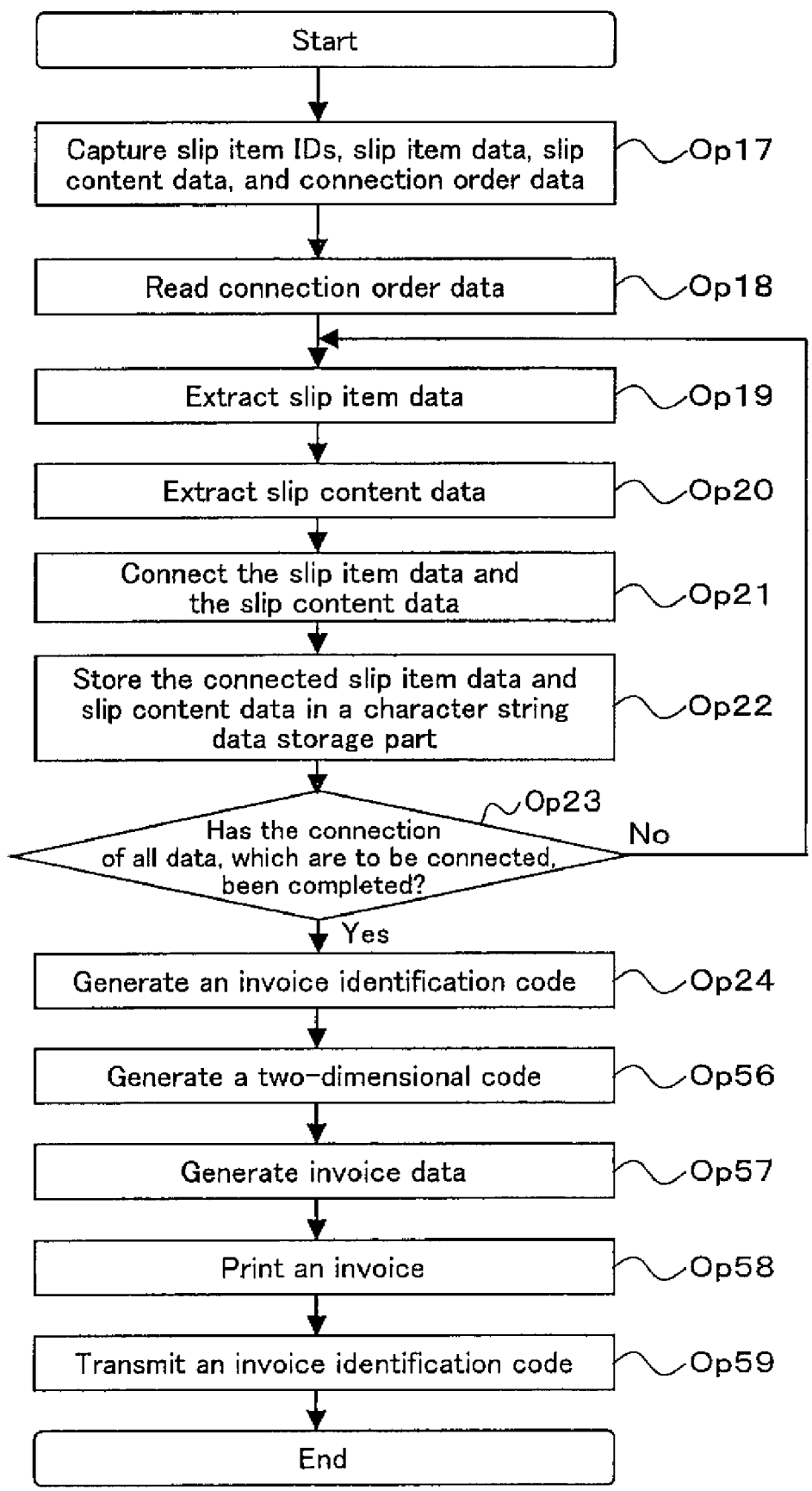
FIG. 26 is a flowchart showing an operation of the above-mentioned invoice issuing apparatus.

Next, the processing of the invoice issuing apparatus 6 in the validity assurance system 10 according to the above configuration will be described with reference to FIG. 26. In FIG. 26, the portions showing the same processing as that in FIG. 13 are denoted with the same reference numerals as those therein, and the detailed description thereof will be omitted.

FIG. 26 is a flowchart showing an outline of the processing of the invoice issuing apparatus 6. In the processing shown in FIG. 26, Operations 17 to 24 are the same as those of shown in FIG. 13.

After Operation 24, the two-dimensional code generating part 61 generates a two-dimensional code, based on the URL data stored in the URL data storage part 660, the connection order data stored in the connection order data storage part 441, and the invoice identification code stored in the invoice identification code storage part 443 (Op56).

Next, the invoice data generating part 62 generates invoice data, based on the slip item data and the slip content data stored in the slip content data storage part 440 and the two-dimensional code stored in the two-dimensional code storage part 661 (Op57). The invoice data generated by the invoice data generating part 62 is displayed on the display screen of the display part 40.

Then, the printing part 48 prints the invoice data displayed on the display screen of the display part 40 as the invoice 6a, in accordance with the instruction from a person in charge of issuing an invoice (Op58). The invoice 6a printed by the printing part 48 is sent from the person in charge of issuing an invoice to the customer, for example, by mail. Then, the transmitting part 63 transmits the invoice identification code stored in the invoice identification code storage part 443 to the information management apparatus 7 in accordance with the instruction from the person in charge of issuing an invoice (Op59).

(Operation Example of a Two-Dimensional Code Reading Apparatus)

Next, the processing of the two-dimensional code reading apparatus 8 in the validity assurance system 10 according to the above configuration will be described with reference to FIG. 27.

Figure 27:
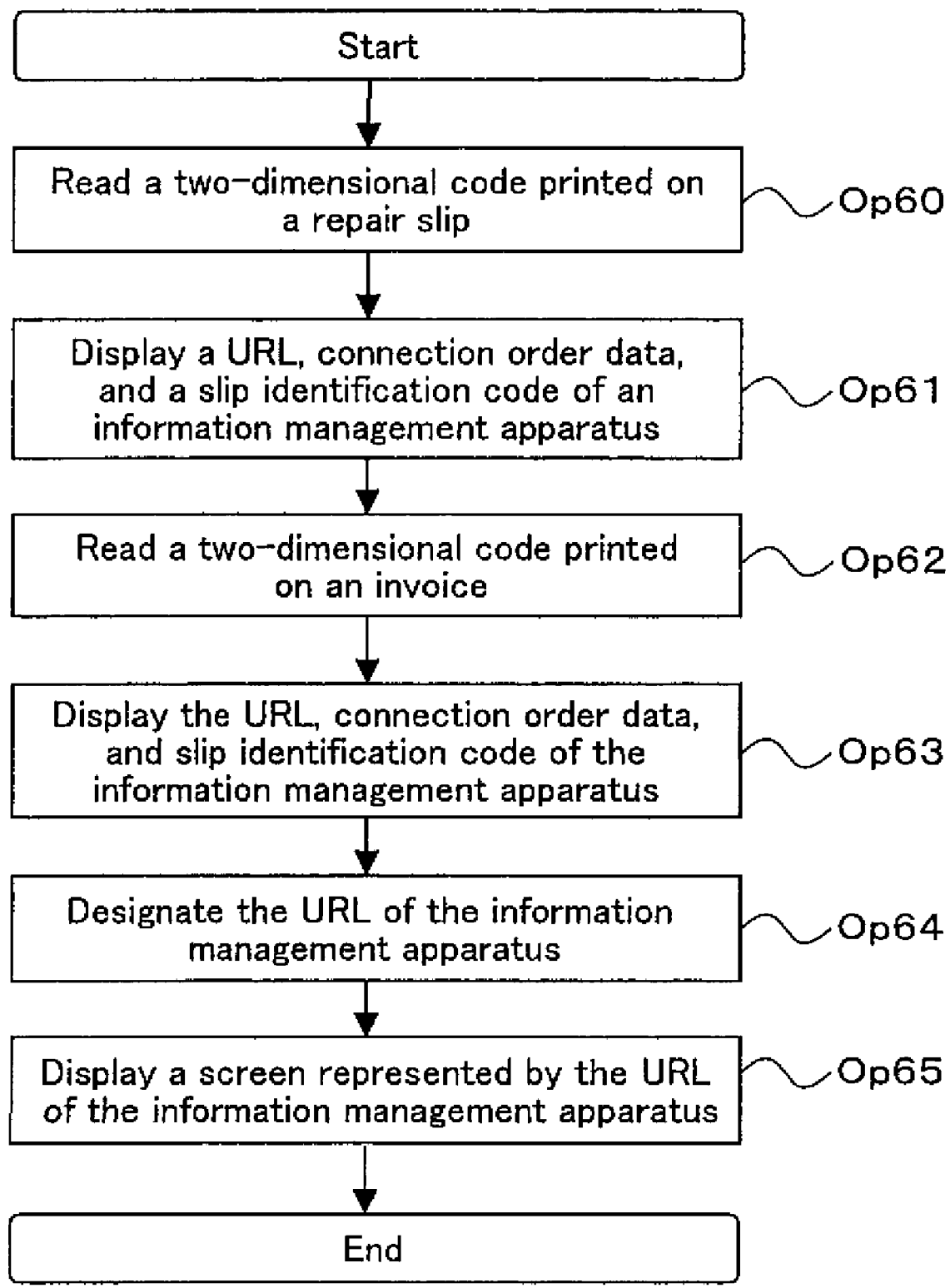
FIG. 27 is a flowchart showing an operation of the above-mentioned two-dimensional code reading apparatus.

FIG. 27 is a flowchart showing an outline of the processing of the two-dimensional code reading apparatus 8. More specifically, as shown in FIG. 27, the customer reads a two-dimensional code printed on the repair slip 5a by the code reading part 83 (Op60). When the code reading part 83 reads a two-dimensional code printed on the repair slip 5a, the display part 80 displays a URL, connection order data, and a slip identification code of the information management apparatus 7 (Op61).

Next, the customer reads a two-dimensional code printed on the invoice 6a by the code reading part 83 (Op62). When the code reading part 83 reads the two-dimensional code printed on the invoice 6a, the display part 80 displays the URL, connection order data, and invoice identification data of the information management apparatus 7 (Op63).

The customer checks whether or not the slip identification code displayed in Operation 61 is matched with the invoice identification code displayed in Operation 63. In the case where the slip identification code is matched with the invoice identification code, the invoice 6a is generated based on the slip content data from which the repair slip 5a held by the customer has been generated. More specifically, the validity of the invoice 6a is assured. If the validity of the invoice 6a is assured, the customer pays a charge amount (repair fee) to a shop or a manufacturer that has conducted the repair, based on the invoice 6a sent from the person in charge of issuing an invoice.

On the other hand, in the case where the slip identification code is not matched with the invoice identification code, the invoice 6a is generated based on the slip content data different from the slip content data from which the repair slip 5a held by the customer has been generated. Therefore, when the input part 81 designates the URL of the information management apparatus 7 displayed in Operation 61 or 63 (Op64), the display part 80 displays a screen represented by the URL of the information management apparatus 7 (Op65). The display part 80 displays the slip item data and the slip content data stored in the information management apparatus 7 as a screen represented by the URL of the information management apparatus 7, for example, as shown in FIG. 23. Consequently, the customer is capable of easily checking which item is wrong.

As described above, according to the validity assurance system 10 according to the present embodiment, the character string data generating part 26 of the terminal apparatus 5 and the character string data generating part 45 of the invoice issuing apparatus 6 generate the same character string data, when the same slip content data are connected in accordance with the same connection order data. In such a case, the slip identification code generating part 27 and the invoice identification code generating part 46 generate the same identification code. More specifically, in the case where the slip identification code is matched with the voucher identification code, the validity of the invoice 6a is assured. On the other hand, contrary to the above, in the case where the slip identification code is not matched with the voucher identification code, the validity of the invoice 6a is not assured. Consequently, in the case where it is checked whether or not the contents of the invoice 6a are matched with the contents of the repair slip 5a, it is not necessary to check whether or not the contents are matched on an item basis as in the above-mentioned conventional example, and only whether or not the slip identification code is matched with the voucher identification code may be checked. Therefore, the customer is capable of easily checking the validity of the invoice 6a without incurring time and labor.

In Embodiment 2, although the example has been described in which the two-dimensional code reading apparatus accesses the information management apparatus and displays slip item data and slip content data stored in the information management apparatus, the present invention is not limited thereto. For example, the two-dimensional code reading apparatus may access the slip management apparatus and display the slip item data and the slip content data stored in the slip management apparatus.

Furthermore, in Embodiments 1 and 2, although the example has been described in which the terminal apparatus generates a repair slip, the present invention is not limited thereto. For example, the terminal apparatus may generate a slip other than a repair slip. Furthermore, although the example has been described in which the invoice issuing apparatus generates an invoice, the present invention is not limited thereto. The invoice issuing apparatus may generate various kinds of documents such as a statement of account, a receipt, an estimate, a statement of delivery, a written order, and an article payment slip, as long as they are generated based on a slip.

Furthermore, in Embodiments 1 and 2, although the example has been described in which a charge amount is paid based on an invoice, the present invention is not limited thereto. More specifically, a monetary charge process is not necessarily conducted. For example, in the case where, in periodical maintenance, no abnormality is found or abnormality, if found, is in a range with no charge, although a charge process with respect to the operation is not conducted, the matching between an inspection operation report (slip) given to a customer by an inspector and an operation performance report (voucher) to be separately issued later may be checked.

Furthermore, in Embodiments 1 and 2, although the case has been described in which a personal computer held by a customer is broken down, and the customer requests a shop or a manufacturer to repair the broken-down personal computer, the present invention is not limited thereto. For example, it should be appreciated that the present invention is applicable even to the case where various electronic appliances such as a refrigerator, a washing machine, a microwave oven, a television, a printer, a facsimile, and a crime-preventing device, and various facilities such as a plant system are broken down. Furthermore, it should be appreciated that the present invention can be applied even to the case where an inspector of a shop or a manufacturer of various appliances and facilities visits periodically to check the presence/absence of abnormality, in addition to the case where various kinds of appliances and facilities are broken down.

As described above, the present invention is useful as a validity assurance system, a validity assurance method, and a recording medium storing a program, capable of easily checking the validity of a voucher without any time and trouble on a customer side.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A validity assurance system, comprising:
a terminal apparatus that generates a slip based on ship item data representing a slip item and slip content data representing a slip content corresponding to the slip item;
a slip management apparatus including a slip management database that stores the slip content data of the slip generated by the terminal apparatus; and
a voucher issuing apparatus that generates a voucher based on the slip content data stored in the slip management database,
wherein the terminal apparatus includes:
a first connection order data storage part that stores first connection order data representing a connection order of the slip content data;
a first character string data generating part that connects the slip content data in accordance with the connection order represented by the first connection order data to generate first character string data; and
a slip identification code generating part that generates a slip identification code determined uniquely from the first character string data,
the voucher issuing apparatus includes:
a second connection order data storage part that stores second connection order data representing a connection order of the slip content data;
a second character string data generating part that connects the slip content data in accordance with the connection order represented by the second connection order data to generate second character string data; and
a voucher identification code generating part that generates a voucher identification code determined uniquely from the second character string data, and
in a case where the slip identification code generated by the slip identification code generating part is matched with the voucher identification code generated by the voucher identification code generating part, validity of the voucher is assured.

2. The validity assurance system according to claim 1, further comprising a two-dimensional code reading apparatus capable of reading a two-dimensional code,
wherein the terminal apparatus includes a first two-dimensional code generating part that generates a first two-dimensional code based on the slip identification code,
the voucher issuing apparatus includes a second two-dimensional code generating part that generates a second two-dimensional code based on the voucher identification code,
the two-dimensional code reading apparatus displays the slip identification code when reading the first two-dimensional code, and
the two-dimensional code reading apparatus displays the voucher identification code when reading the second two-dimensional code.

3. The validity assurance system according to claim 2, further comprising an information management apparatus capable of communicating with the two-dimensional code reading apparatus,
wherein the information management apparatus includes:
a data collecting part that collects the slip content data stored in the slip management database; and
an information management database that stores the slip content data collected by the data collecting part, and
the two-dimensional code reading apparatus displays the slip content data stored in the information management database when accessing the information management database.

4. The validity assurance system according to claim 1,
wherein the terminal apparatus includes: a slip content data storage part that stores the slip item data and the slip content data; and
a connection order data generating part that generates first connection order data representing a connection order of the slip content data, and
the connection order data generating part randomly determines the connection order of the slip content data from the slip content data stored in the slip content data storage part, thereby generating the first connection order data.

5. The validity assurance system according to claim 1, wherein the slip identification code generating part generates the slip identification code for each of the slip content data represented by the first character string data, and
the voucher identification code generating part generates the voucher identification code for each of the slip content data represented by the second character string data.

6. A recording medium storing a program that causes a computer to function as the terminal apparatus of the validity assurance system according to claim 1,
wherein the program causes the computer to execute:
processing of generating a slip based on slip item data representing a slip item and slip content data representing a slip content corresponding to the slip item;
first connection order data storage processing of storing first connection order data representing a connection order of the slip content data in a first connection order data storage part;
first character string data generating processing of connecting the slip content data in accordance with the connection order represented by the first connection order data to generate first character string data; and
slip identification code generating processing of generating a slip identification code determined uniquely from the first character string data.

7. A recording medium storing a program that causes a computer to function as the slip management apparatus of the validity assurance system according to claim 1,
wherein the program causes the computer to execute:
slip content data acquiring processing of acquiring the slip content data representing the slip content of the slip generated by the terminal apparatus;
slip management database storage processing of storing the slip content data acquired in the slip content data acquiring processing in the slip management database;
slip content data reading processing of reading the slip content data stored in the slip management database in accordance with a request from the voucher issuing apparatus; and
slip content data transmitting processing of transmitting the slip content data read in the slip content data reading processing to the voucher issuing apparatus.

8. A validity assurance method realizing a validity assurance system including:
a terminal apparatus that generates a slip based on slip item data representing a slip item and slip content data representing a slip content corresponding to the slip item;

a slip management apparatus including a slip management database that stores the slip content data of the slip generated by the terminal apparatus; and a voucher issuing apparatus that generates a voucher based on the slip content data stored in the slip management database, the method comprising:

a first connection order data storage operation for the terminal apparatus to store first connection order data representing a connection order of the slip content data in a first connection order data storage part;

a first character string data generating operation for the terminal apparatus to connect the slip content data to generate first character string data in accordance with the connection order represented by the first connection order data; and a slip identification code generating operation for the terminal apparatus to generate a slip identification code determined uniquely from the first character string data, the method comprising:

a second connection order data storage operation for the voucher issuing apparatus to store second connection order data representing a connection order of the slip content data in a second connection order data storage part;

a second character string data generating operation for the voucher issuing apparatus to connect the slip content data in accordance with the connection order represented by the second connection order data to generate second character string data; and a voucher identification code generating operation for the voucher issuing apparatus to generate a voucher identification code determined uniquely from the second character string data, and in a case where the slip identification code generated in the slip identification code generating operation is matched with the voucher identification code generated in the voucher identification code generating operation, validity of the voucher is assured.

9. A recording medium storing a validity assurance program containing:

a first program that causes a first computer to execute processing of generating a slip based on slip item data representing a slip item and slip content data representing a slip content corresponding to the slip item;

a second program that causes a second computer to execute slip management database storage processing of storing the slip content data of the slip generated by the first computer in a slip management database; and a third program that causes a third computer to execute processing of generating a voucher based on the slip content data stored in the slip management database, wherein the first program causes the first computer to execute:

first connection order data storage processing of storing first connection order data representing a connection order of the slip content data in a first connection order data storage part;

first character string data generating processing of connecting the slip content data in accordance with the connection order represented by the first connection order data to generate first character string data; and slip identification code generating processing of generating a slip identification code determined uniquely from the first character string data, and the third program causes the third computer to execute:

second connection order data storage processing of storing second connection order data representing a connection order of the slip content data in a second connection order data storage part;

second character string data generating processing of connecting the slip content data in accordance with the connection order represented by the second connection order data to generate second character string data; and voucher identification code generating processing of generating a voucher identification code determined uniquely from the second character string data.

* * * * *